United States Patent
Dougherty et al.

(10) Patent No.: US 7,242,686 B1
(45) Date of Patent: Jul. 10, 2007

(54) SYSTEM AND METHOD FOR COMMUNICATING TDM TRAFFIC THROUGH A PACKET SWITCH FABRIC

(75) Inventors: David Thomas Dougherty, Rancho Santa Fe, CA (US); Michael Alec Sluyski, Maynard, MA (US); Kenneth Yi Yun, San Diego, CA (US); George Beshara Bendak, San Diego, CA (US); John David Huber, San Diego, CA (US); Kirk Alvin Miller, San Diego, CA (US); Peter John Holzer, Fallbrook, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1003 days.

(21) Appl. No.: 10/403,566

(22) Filed: Mar. 31, 2003

Related U.S. Application Data

(63) Continuation-in-part of application No. 10/035,835, filed on Dec. 24, 2001, now Pat. No. 7,020,131, and a continuation-in-part of application No. 10/029,581, filed on Dec. 20, 2001, and a continuation-in-part of application No. 10/022,673, filed on Dec. 17, 2001, now Pat. No. 7,079,545, and a continuation-in-part of application No. 10/023,266, filed on Dec. 14, 2001, now abandoned.

(51) Int. Cl.
*H04L 12/56* (2006.01)
(52) U.S. Cl. ............ 370/395.4; 370/401; 370/498
(58) Field of Classification Search ............ 370/498, 370/401, 395.4
See application file for complete search history.

(56) References Cited

U.S. PATENT DOCUMENTS

| | | | | |
|---|---|---|---|---|
| 6,636,515 | B1 * | 10/2003 | Roy et al. | 370/395.1 |
| 6,643,297 | B1 * | 11/2003 | Sproat et al. | 370/498 |
| 2003/0152084 | A1 * | 8/2003 | Lee et al. | 370/395.21 |
| 2004/0081167 | A1 * | 4/2004 | Hassan-Ali et al. | 370/395.42 |

OTHER PUBLICATIONS

John Sotir, "Stretch Your TMD Network to Meet Next-Generation Needs", Communication Systems Design, Mar. 2003, pp. 27-29.

* cited by examiner

*Primary Examiner*—Brian Nguyen
(74) *Attorney, Agent, or Firm*—Law Office of Gerald Maliszewski; Gerald Maliszewski

(57) ABSTRACT

A system and method are provided for communicating TDM communications through a packet switch fabric. The method comprises: accepting native TDM frames; converting the native TDM frames to fabric-cellified TDM frames; differentiating the cells of each frame into time slots; interleaving the frame time slots; TDM scheduling the interleaved frame time slots; and, routing the interleaved frame time slots between input port cards and output port cards on backplane data links through an intervening crossbar. TDM scheduling the interleaved frame time slots includes: an input port card ingress memory subsystem (iMS) receiving a first TDM configuration schedule including interleaved frame time slots cross-referenced to backplane transmission times; and, an output port card egress MS (eMS) receiving a second TDM configuration schedule including interleaved frame time slots cross-referenced to egress channel transmission times. Then, the routing is performed in response to the TDM schedules.

32 Claims, 19 Drawing Sheets

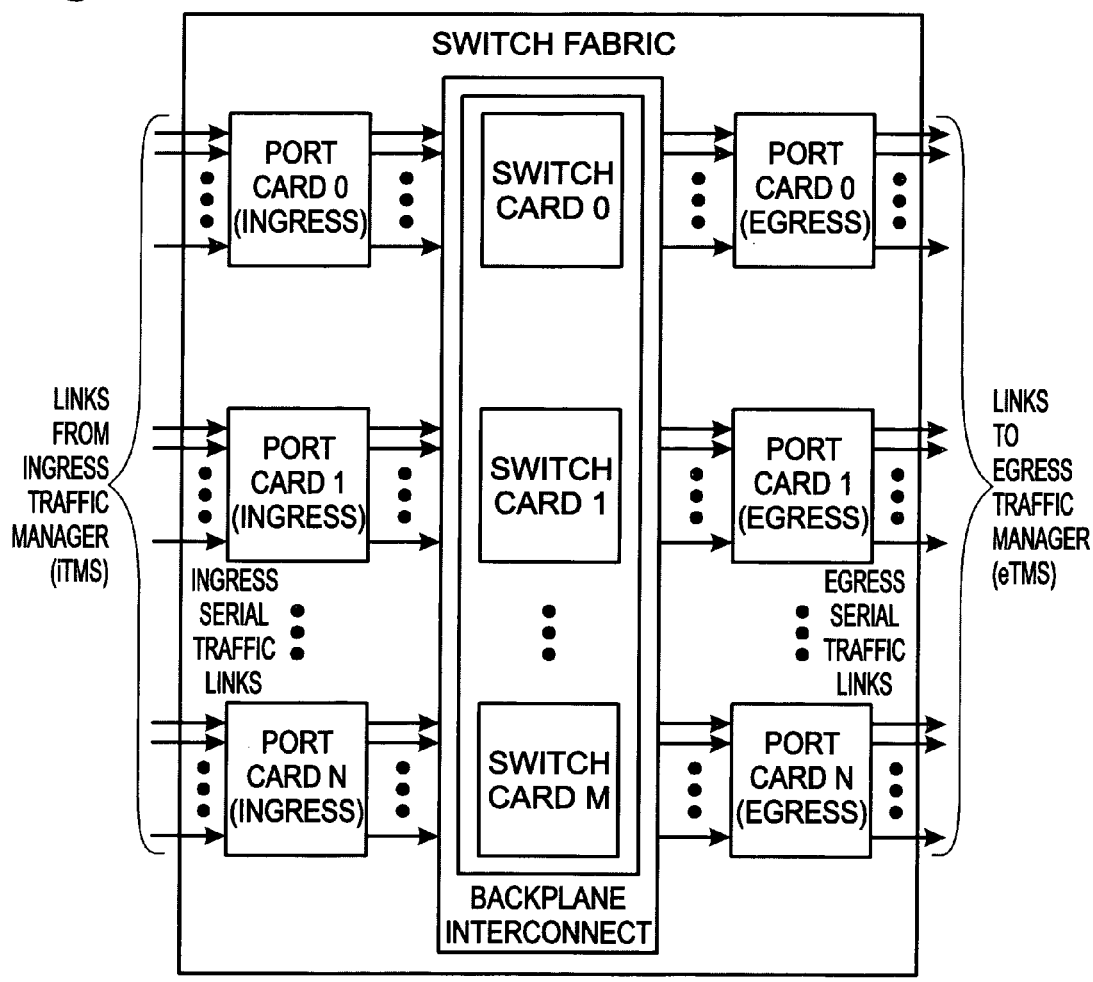
Fig. 20 *(PRIOR ART)*

SYSTEM AND METHOD FOR COMMUNICATING TDM TRAFFIC THROUGH A PACKET SWITCH FABRIC

RELATED APPLICATIONS

This application is a continuation-in-part of a application entitled, SYSTEM AND METHOD FOR SWITCHING VARIABLY SIZED INFORMATION GROUPS, invented by Yun et al., Ser. No. 10/023,266, filed Dec. 14, 2001, now abandoned.

This application is a continuation-in-part of a application entitled, SYSTEM AND METHOD FOR SIMULTANEOUS DEFICIT ROUND ROBIN PRIORITIZATION, invented by Yun et al., Ser. No. 10/022,673, filed Dec. 17, 2001, now U.S. Pat. No. 7,079,545.

This application is a continuation-in-part of a pending application entitled, SYSTEM AND METHOD FOR GRANTING ARBITRATED BIDS IN THE SWITCHING OF INFORMATION, invented by Yun et al., Ser. No. 10/029,581, filed Dec. 20, 2001.

This application is a continuation-in-part of a application entitled, SYSTEM AND METHOD FOR HIERARCHICAL SWITCHING, invented by Yun et al., Ser. No. 10/035,835, filed Dec. 24, 2001, now U.S. Pat. No. 7,020,131.

This application is a continuation-in-part of a pending application entitled, SYSTEM AND METHOD FOR TOLERATING DATA LINK FAULTS IN A PACKET COMMUNICATIONS SWITCH FABRIC, invented by Clovis et al., Ser. No. 10/373,139, filed Feb. 24, 2003, which is incorporated herein by reference.

BACKGROUND OF THE INVENTION

1. Field of the Invention

This invention generally relates to packet communications switching and, more particularly, to a cut-through packet routing system and that can support time division multiplexed (TDM) traffic as well as packet traffic.

2. Description of the Related Art

There is industry demand for integrated circuits (ICs) switching systems that can be easily scaled for Network Access, the Network Edge, or a Core Switch Router, at the high end. SCSA (Signal Computing System Architecture) defines a switch fabric to be the facility for connecting any two (or more) transmitting or receiving Service Providers.

FIG. 20 is a schematic block diagram of a general switch fabric system (prior art). Traffic enters the system on the ingress side (the left side of the figure). Traffic exits the system on the egress side (the right side of the figure). The port card ingress and egress structures are sometimes subdivided into channels and subchannels. The packet headers specify a required destination port card, channel, and subchannel. The system must synchronously route each ingress packet to the correct egress destination.

Packets are converted into frames by ingress traffic managers (iTMs). A frame is a logical unit of data, which is often a small piece of a much larger data set such as a file or image. The iTMs feed the ingress side of the fabric. The switch fabric might convert the frame format to a "native" format, and then on egress, convert the data back into the TM frame format before sending the data to the egress traffic managers (eTMs). If the frames are fixed size (for example: 53 bytes, 64 bytes, or 80 bytes), the frames are often called cells.

Protocol Specific Vs. Protocol Agnostic

A switch fabric can be protocol specific or protocol agnostic. An example of a protocol specific switch fabric would be a system designed and optimized specifically for asynchronous transfer mode (ATM) traffic. Another example would be a switch that handles only TCP/IP traffic. The obvious disadvantage of a switch fabric hardwired to handle a specific protocol is lack of flexibility. Service providers want to sell services to a variety of customers in various industries. Protocols vary from industry to industry.

Even within one protocol type, there can be protocol upgrades. For example, TCP/IP, the machine language of Internet routers, now runs primarily "IPv4." This protocol, successful as it has been, has a lack of available addresses, poor security features, and no "quality of service" (QoS) provisions. The next generation Internet protocol is "IPv6." It provides solutions to these limitations.

A protocol agnostic switch fabric works equally well with all protocol types, however, the traffic manager must be responsible for recognizing specific protocol types. The disadvantage of a protocol agnostic switch fabric is that it may be more complicated, and perhaps slower than a switch fabric dedicated to a particular protocol.

Packet Striping Vs. Single Link Per Packet

The simplest way for a traffic manager to transmit a packet into a switch fabric is to transmit the packet serially along one line. Striping is a way of achieving higher bandwidth by transmitting a single packet across multiple ingress/egress lines. For example, a TM can transmit a packet into a switch fabric eight times as fast if the packet is sliced into eight pieces (stripes) by the TM, and conveyed into the fabric along 8 parallel lines simultaneously. The fabric captures the packet in memory, routes it to the required egress destination, and slices the packet into 8 parallel lines before transmitting the packet to the egress TM.

The upside to packet striping is the potential for lower latency. There are several negative aspects of packet striping:

if one of the links is damaged (1 of 8 in the example above), the entire channel is out of service, degrading fault tolerance; and, the interface between the TM and switch fabric is more complicated. Circuitry must be used to slice the packet into stripes and reassemble it into packets.

Single-Cell Packet Vs. Multi-Cell Packets

Many switch fabrics now deployed and passing revenue traffic, especially in wide area networks (WANs), use asynchronous transfer mode (ATM) packets. ATM packets are single-cell packets, with a fixed cell size of 53 bytes, 48 bytes of which is the information payload. The ATM specification evolved in the 1980s and early 1990s. It was then believed that variable length (multi-cell) packets would be too difficult to implement at rates needed for wire-speed traffic. The single-cell solution was a compromise that would work for voice data, video data, multimedia data, email data, file data, etc. With a fixed frame size, switch designs are simplified and ultimately faster.

However, files are better sent in large frames. Voice switching performs better with small bursts of data, corresponding to analog-to-digital converter time slots. Large frames and concomitant switching latencies can render a switch useless for most 2-way voice applications. Voice communications require low latency (time delay). Since ATM had to work for all network data, the small payload (voice) requirements prevailed at the expense of the large frame applications.

For large frames or packets it is much more efficient to establish a path from an ingress port card to the required egress destination, and then leave this path undisturbed until the packet is completed. With single cell packets, the ingress port card must bid for, accept grants, and then schedule each cell of a multi-cell packet.

There are also Frame Relay switch fabrics. Frame Relay is a single-cell protocol, albeit with frame size ranging from 6 to 4096 bytes. Such switch fabrics have been deployed and passing revenue traffic since the early 1990s. These switch fabrics have generally not been used for voice data because of the large latency. Only highly compressed voice traffic works well over frame relay. Voice-over-frame relay was added as an afterthought by network engineers. Frame relay excels at data communications such as local area network internetworking (LAN-to-LAN). Such communications are very high speed and bursty, with non-critical latency constraints.

Cut-Through Vs. Store-and-Forward

The conventional method of switch fabric packet routing is called Store-and-Forward. In this method, the switch fabric accepts an input packet and buffers the packet on the ingress side of the fabric, making sure the packet was received intact, knowing the exact number of cells in the packet. The problem with the store-and-forward method is the added latency of buffering the packet. In Cut-through Packet Routing (CPR), a switch fabric is able to send the incoming packet cells to the correct egress port as soon as the destination address is known.

Memory-Based Vs. Arbitrated Crossbar

A switch fabric can use memory-based crossbars or arbitrated crossbars. A memory-based crossbar is sometimes called a "shared memory switch." Ingress packets flow from the port cards into a huge memory bank, which serve as the switch. From the memory bank, the destination address is determined from egress port destination information in the cell headers. The problem with these switch fabrics is that they become prohibitively expensive and large from all the required high-speed memory. Such fabrics cannot be used to reach terabit total switching speeds with technology available today.

Packet Vs. Time Division Multiplexing (TDM)

As noted by John Sotir, in "Stretch Your TDM Network to Meet Next-Generation Needs", Communication Systems Design, March 2003, pp. 27-29, TDM is an established international standard, where voice is sampled (digitized) 8,000 times per second. The results are carried as 8-bit data samples, resulting in the well-known, 64-kbit/second bandwidth for an uncompressed voice call. Because this is a universal technique, it is possible to call anywhere in the world from virtually any telephone device and have the call go through with what is now perceived as excellent quality. To provide the broad reach and interoperability demanded by customers, communications systems, whether wireless telephony or Internet Protocol telephony (voice over IP), require some type of device to interface to TDM networks.

When 64-kbit/s voice streams reach central offices and switching stations, they are multiplexed onto single channels of communications, preserving the 125-microsecond time slots, or frames, required by a sampling rate of 8,000 Hz. These "single channels" have grown dramatically in the recent past from T1/E1 connections (1.5/2.0 Mbits/s) to OC-3, OC-12 and OC-48 connections.

Various types of communications equipment today are under development to bring next-generation TDM systems up to the higher capacity and performance levels needed to meet next-generation demands. The equipment includes pure TDM devices, such as remote-access servers, large TDM gateways, medium to large central-office TDM switches, digital cross connects, mobile switching centers, access concentrators and servers, as well as devices (such as voice-over-IP gateways, multiservice access platforms, media gateways and digital-loop carriers) that straddle the circuit-switched-to-packet-switched divide.

The heart of a TSI (Time Slot Interchange) consists of the switching fabric that performs the nonblocking switching function, a memory block for the time slot data, and a separate memory for the switching configuration. In some TSI configurations, the interchange fabric will be able to switch any of the 147,456 possible incoming time slots to any of the 16,384 possible outgoing time slots, addressing the capacity issue. The interchange fabric performs this switching function without regard to the physical link from which the time slot was taken, a fact that allows the TSI to be called a time-space switch.

Prior art attempts in using TDM switches to pass packet traffic have been done, but with drawbacks. Packet traffic is "bursty," meaning it is transmitted in brief uneven spurts. Allocating TDM time slots and trunk lines can waste bandwidth and is also expensive. The TDM circuits must wait idle until a burst of packet traffic comes along, and then return to the idle state. The guaranteed exact arrival time of TDM is not needed for the majority of packet traffic types. TDM provides a costly resource of a fixed path, of known bandwidth and delivery time, through the public switched traffic network (PSTN). Packet traffic does not need this expensive resource.

Many conventional attempts in using packet switches to handle TDM traffic have also fallen short. Some of these drawbacks are as follows: Prior art packet fabrics introduce too much processing latency for TDM. The total one-way latency for PSTN networks should be less than 250 milliseconds. Much of this time is needed for point-to-point transmission delay which cannot be avoided. The actual switching should therefore add nearly negligible latency.

Many conventional packet fabrics introduce too much delay jitter to the PSTN circuit. For voice communications, the arrival times of speech must be consistent. So, if point-to-point one-way transmission delay is 200 milliseconds, the voice signals should arrive at 200 milliseconds plus or minus 10 milliseconds, consistently. Conventional packet fabrics may introduced delay jitter of plus or minus 100 milliseconds, which is unacceptable for voice.

Some earlier attempts in using packet switches to handle TDM traffic have also lacked a TDM grooming capability. Grooming is the process in which a switch consolidates or segregates traffic for efficiency. TDM grooming would include the capability of "combing" the incoming TDM traffic into orderly bundles, organized as a function of destination and required bandwidth.

To get around these problems, conventional packet fabrics must dedicate some entire crossbars to packet traffic, and other entire crossbars to TDM traffic. Such a solution can be wasteful of crossbar resources. It would be preferable to be able to allocate any desired number of links in a packet fabric to TDM traffic, without the excessive latency or delay jitter problems described above.

It would be advantageous if a switch fabric could simultaneously manage both packet and TDM traffic.

It would be advantageous if a switch fabric could efficiently switch both packet and TDM traffic.

SUMMARY OF THE INVENTION

The present invention introduces a switch fabric that is able to efficiently process both packet and TDM traffic. The present invention switch fabric is able to "best effort" process the packet traffic, while guaranteeing predetermined data links through the fabric for the TDM traffic.

Accordingly, a method is provided for communicating TDM communications through a packet switch fabric. The method comprises: accepting native TDM frames; converting the native TDM frames to fabric-cellified TDM frames; differentiating the cells of each frame into time slots; interleaving the frame time slots; TDM scheduling the interleaved frame time slots; and, routing the interleaved frame time slots between input port cards and output port cards on backplane data links through an intervening crossbar.

TDM scheduling the interleaved frame time slots includes: an input port card ingress memory subsystem (iMS) receiving a first TDM configuration schedule including interleaved frame time slots cross-referenced to backplane transmission times; and, an output port card egress MS (eMS) receiving a second TDM configuration schedule including interleaved frame time slots cross-referenced to egress channel transmission times. Then, routing the interleaved frame time slots between input port cards and output port cards on backplane data links through an intervening crossbar includes: the iMS transmitting interleaved frame time slots on backplane data links to the eMS in response to the first TDM configuration schedule; and, the eMS transmitting interleaved frame time slots on egress channels in response to the second TDM configuration schedule. In other aspects, a crossbar arbiter receives a third TDM configuration schedule including interleaved frame time slots cross-referenced to backplane transmission times; and, the arbiter enables backplane data link connections between the crossbar and the port cards in response to the third TDM configuration schedule.

Additional details of the above-described method and a system for communicating TDM communications through a packet switch fabric are provided below.

BRIEF DESCRIPTION OF THE DRAWINGS

FIG. 20 is a schematic block diagram of a general switch fabric system (prior art).

DETAILED DESCRIPTION OF THE PREFERRED EMBODIMENTS

Figure 1:
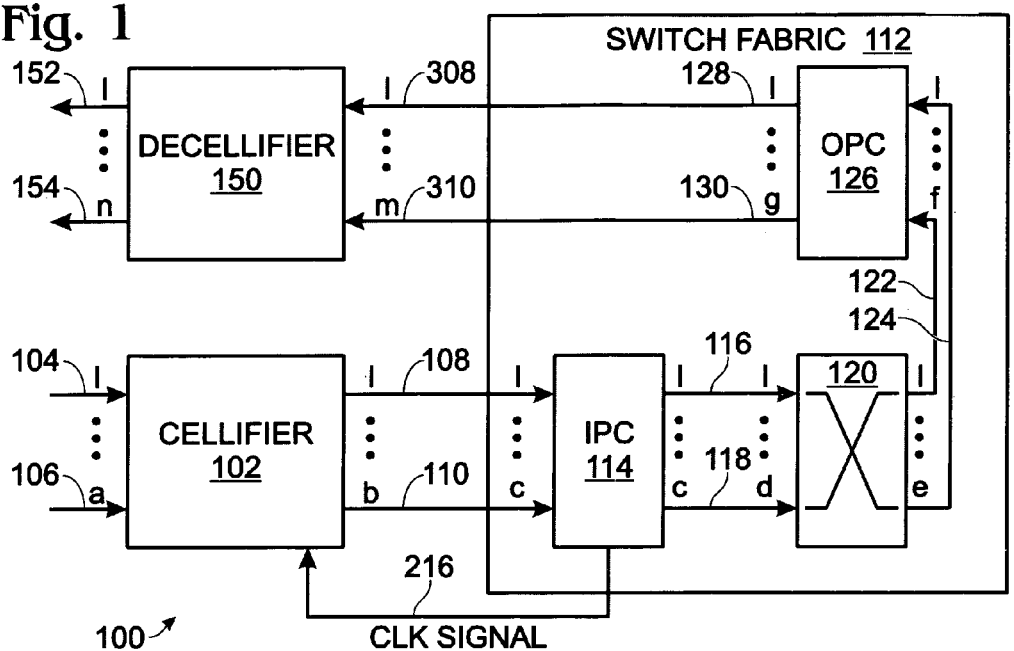
FIG. 1 is a schematic block diagram of the present invention system for communicating TDM communications through a packet switch fabric.

FIG. 1 is a schematic block diagram of the present invention system for communicating TDM communications through a packet switch fabric. The system 100 comprises a cellifier (or cellularizer) 102 having inputs 1 through a on lines 104 through 106, respectively, to accept native TDM frames. The native TDM frames can be SONET or Digital Wrapper frames, for example. The cellifier 102 has outputs 1 through b on lines 108 through 110 to supply interleaved fabric-cellified TDM frames differentiated into time slots, on a TDM schedule. Note that the cellifier 102 is not limited to any particular number of inputs or outputs.

A switch fabric 112 includes an input port card (IPC) 114 having ingress ports connected to the cellifier outputs on lines 108 and 110. IPC 114 has ingress backplane data links 1 through c on lines 116 through 118 to supply interleaved frame time slots on a TDM schedule. Note that the IPC 114 is not limited to any particular number of ingress data links of backplane data links. Also note that the IPC 114 may have ingress ports connected to other cellifiers (not shown). Further, it is typical for the switch fabric 112 to include a plurality of IPCs (not shown). In that circumstance, the unseen IPCs may also have connections to the cellifier 102.

A crossbar 120 having inputs 1 through d on lines 116 through 118 connected to IPC 114 ingress backplane data links. The crossbar 120 is not limited to any particular inputs. In some aspects, the crossbar 120 is connected to additional ingress backplane data links from the IPC 114 that carry either TDM or packet traffic. Further, the crossbar 120 may have inputs connected to the ingress backplane data links of other IPCs (not shown). As is typical, the crossbar inputs 1 through d can be selectively connecting to crossbar outputs 1 through e on lines 122 through 124. The value of e is not limited to any particular value. It is also typical that the system 100 includes a plurality of crossbars (not shown).

An output port card (OPC) 126 has egress backplane data links 1 through f on lines 122 through 124 connected to crossbar outputs. The OPC 126 also has egress channels, or egress ports, 1 through g on lines 128 through 130 to supply interleaved frame time slots on a TDM schedule. Again, the values of f and g are not limited to any particular number. Some aspects of the system 100 include a plurality of OPCs (not shown).

Figure 2:
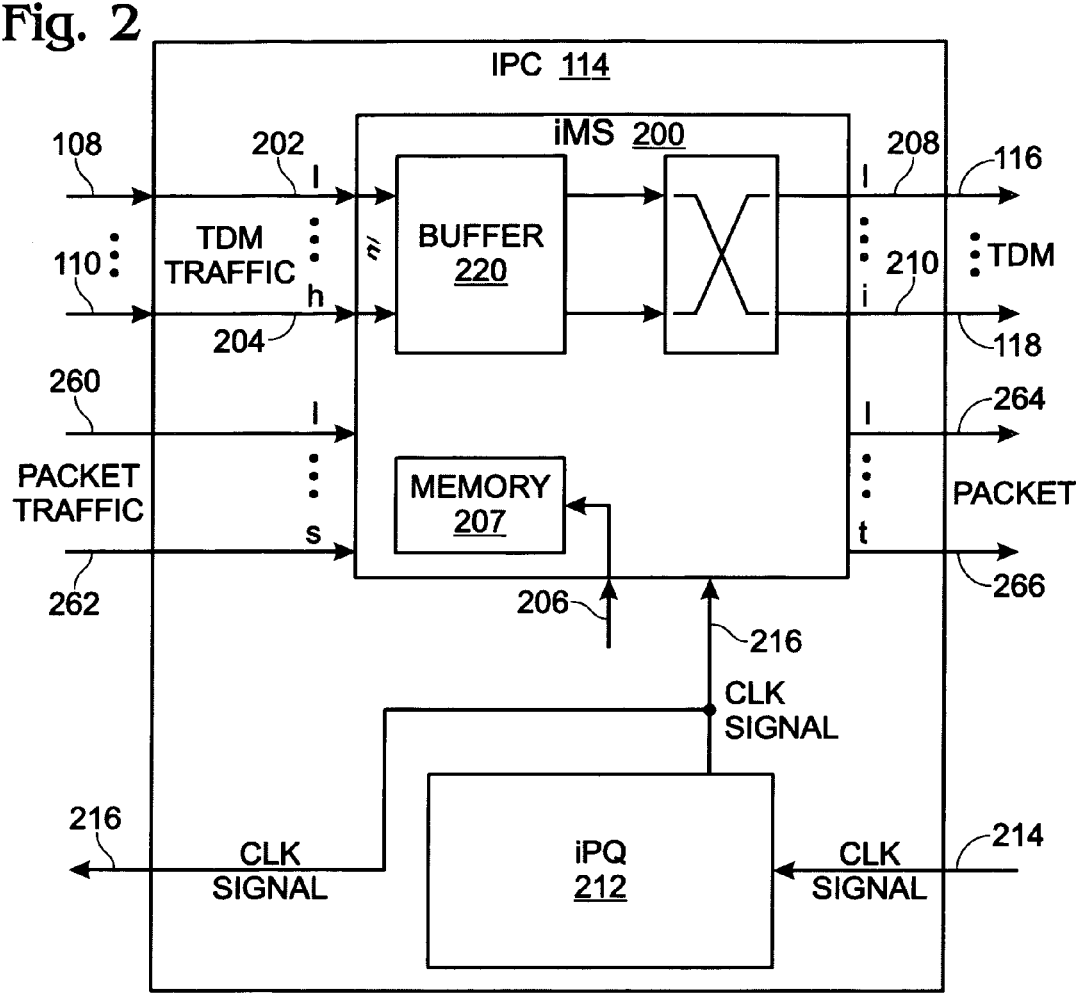
FIG. 2 is a more detailed schematic block diagram of the IPC of FIG. 1.

FIG. 2 is a more detailed schematic block diagram of the IPC 114 of FIG. 1. The input port card 114 includes an ingress memory subsystem (iMS) 200. The iMS 200 has inputs 1 through h on lines 202 through 204 to accept the interleaved frame time slots and an input on line 206 to accept a first TDM configuration schedule, with interleaved frame time slots cross-referenced to backplane transmission times. The first TDM schedule is stored in memory 207. The iMS 200 has outputs 1 through i on lines 208 through 210 connected to ingress backplane data links to supply interleaved frame time slots in response to the first TDM configuration schedule. The values of h and i are not limited to any particular value. In some aspects, the IPC 114 may include a plurality of iMSs (not shown).

Figure 3:
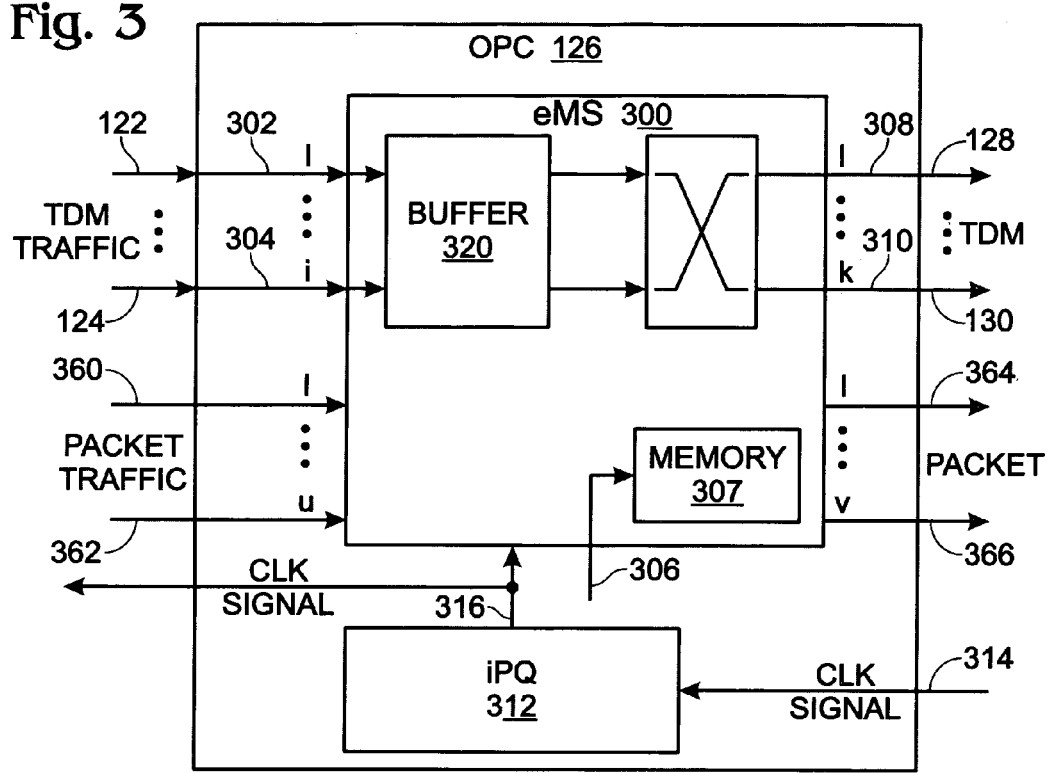
FIG. 3 is a schematic block diagram illustrating the OPC of FIG. 1 in greater detail.

FIG. 3 is a schematic block diagram illustrating the OPC 126 of FIG. 1 in greater detail. The output port card 126 includes an egress MS (eMS) 300 having inputs 1 through j on lines 302 through 304 to accept the interleaved frame time slots on the egress backplane data links. The eMS 300 has an input on line 306 to accept a second TDM configuration schedule, with interleaved frame time slots cross-referenced to egress channel transmission times. The TDM schedules are typically provided in bid/grant control link communications with a arbiter. The second TDM schedule is stored in memory 307. The eMS 300 has outputs 1 through k on lines 308 through 310 connected to egress channels to supply interleaved frame time slots in response to the second TDM configuration schedule. The values of j and k are not limited to any particular value. In some aspects, the OPC 126 may include FIFO MSs (not shown) interposed between the egress backplane data links and the eMS inputs.

Considering FIGS. 1, 2, and 3, the input port card 114 includes an ingress priority queue (iPQ) 212 and output port card 126 includes ingress priority queue 312. Each iPQ 212/312 has an input to accept a TDM clock signal on lines 214 and 314, respectively. Again, the clock signals are typically supplied in bid/grant control link communications with an arbiter. Each iPQ 212/312 also has an output to distribute the TDM clock signal on lines 216 and 316, respectively. This clock signal is related to the 8 kilohertz signal mentioned in the discussion of TDM fabrics in the Background Section, above.

The cellifier 102 has an input on line 216 to accept the TDM clock signal from the input port card iPQ 212, for synchronizing the time slot and interleaving of cells. Likewise, the iMS 200 has an input on line 216 to accept the TDM clock signal from the input port card iPQ 212, for synchronizing to the first TDM configuration schedule. The eMS 300 has an input on line 316 to accept the TDM clock signal from the output port card iPQ 312, for synchronizing to the second TDM configuration schedule.

Figure 4:
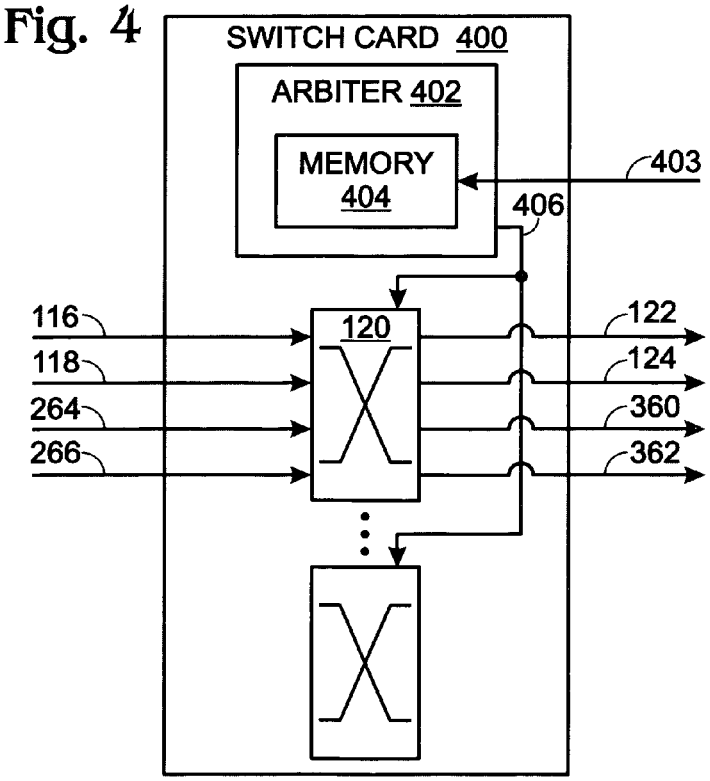
FIG. 4 is a schematic block diagram detail of the crossbar of FIG. 1.

FIG. 4 is a schematic block diagram detail of the crossbar of FIG. 1. A switch card 400 includes an arbiter 402. The switch card arbiter 402 has an input on line 403 to accept a third TDM configuration schedule including interleaved frame time slots cross-referenced to backplane transmission times. The third TDM schedule is stored in memory 404. The arbiter 402 has an output on line 406 to supply crossbar selection commands in response to the third TDM configuration schedule. The crossbar 120 resides with the switch card 400 and has an input on line 406 to accept the crossbar selection commands from the arbiter, for enabling backplane data link connections between the crossbar and the port cards.

In some aspects, the iMS 200 also includes a memory buffer 220 for storing the accepted interleaved time slots prior to transmission on the backplane data links. This buffer 220 can be shallow. Since the TDM cells are transferred through the fabric on a predetermined schedule, there is little need for buffering. Likewise, the eMS 300 includes a memory buffer 320 for storing the accepted interleaved time slots.

Figure 5B:
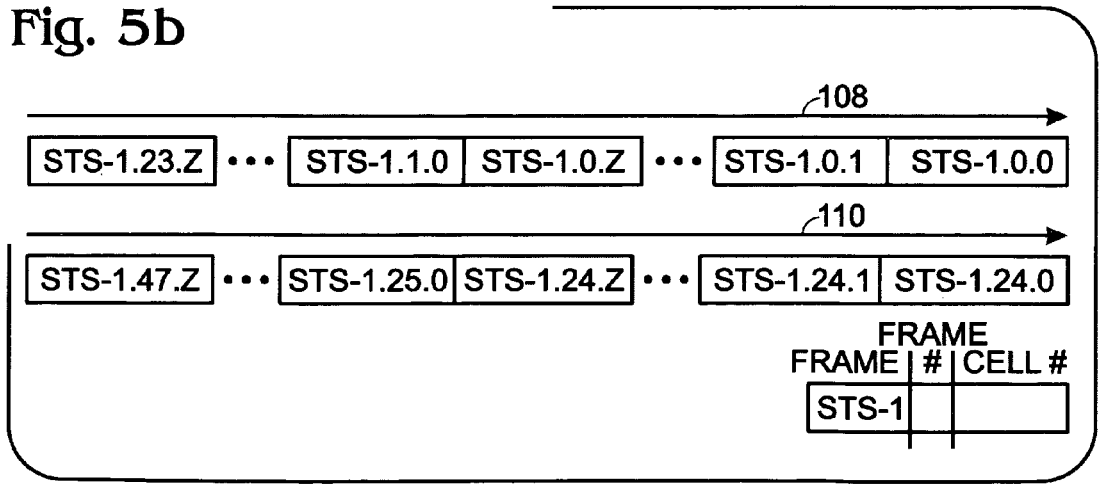
FIG. 5*b* is a diagram illustrating the interleaved fabric-cellified TDM frames output by the cellifier.
Figure 5A:
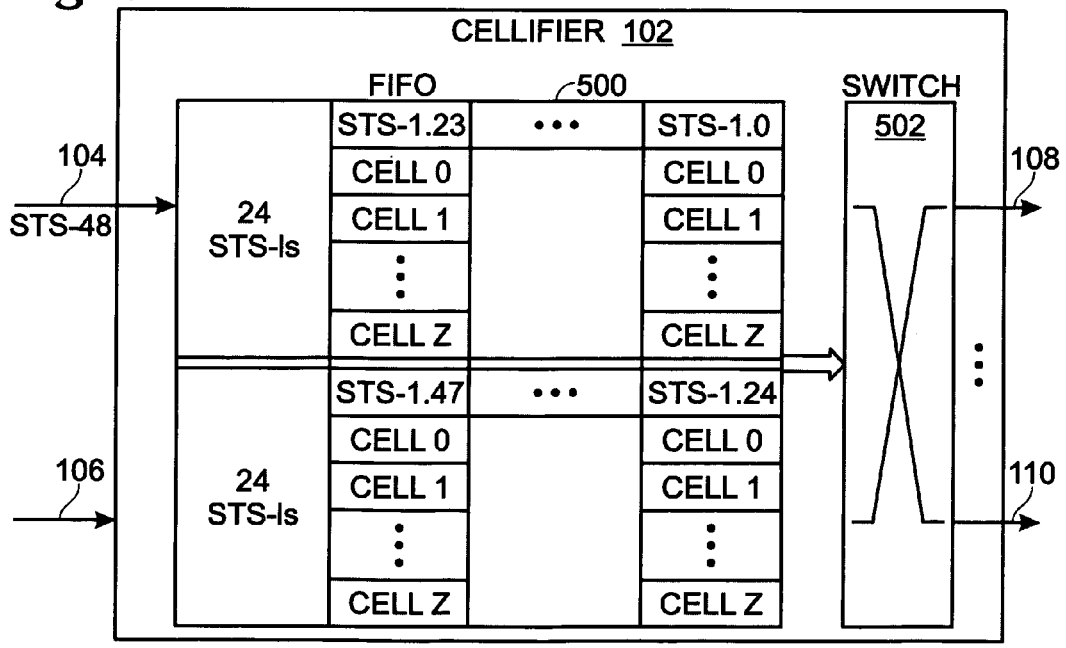
FIG. 5*a* is a schematic block diagram illustrating details of the cellifier of FIG. 1.

FIG. 5a is a schematic block diagram illustrating details of the cellifier 102 of FIG. 1. The cellifier 102 includes a plurality of FIFOs 500. The cellifier 102 uses the time slot FIFOs 500 to temporally multiplex the frame time slots. As shown, the cellifier is receiving an STS-48 frame on line 104, and temporally multiplexing cells from that frame onto two different links 108/110 to the IPC, where each link carries 24 STS-1 frames. The cellifier 102 also includes a switch 502 for spatially multiplexing the interleaved frame time slots on the plurality of cooperating dedicated ingress data links. Note that the temporally multiplexing function is not limited to any particular bandwidth or any particular number of output data links.

FIG. 5b is a diagram illustrating the interleaved fabric-cellified TDM frames output by the cellifier 102.

Considering FIGS. 1 through 5a, the iMS 200 accepts interleaved frame time slot traffic flow on dedicated ingress data links 104 through 106 from the cellifier 102. Likewise, the arbiter 402 dedicates backplane data links to the interleaved frame time slot traffic flow between input and output port cards. For example, the arbiter 402 may dedicate backplane data links 208 through 210 and 302 through 304 to TDM traffic. Further, the eMS 300 provides interleaved frame time slot traffic flow on dedicated egress data links 308 through 310.

The iMS 200 may accept interleaved frame time slots on a plurality of cooperating dedicated ingress data links (as shown). The arbiter 402 may dedicate a plurality of cooperating backplane data links to the interleaved frame time slot traffic flow between input and output port cards. The iMS 200 includes a switch 230 for spatially multiplexing the interleaved frame time slots on the plurality of cooperating dedicated backplane data links 208 through 210. Likewise, the eMS 300 may provide interleaved frame time slot traffic flow on a plurality of cooperating dedicated egress data links. The eMS 300 includes a switch 330 for spatially multiplexing the interleaved frame time slots on the plurality of cooperating dedicated egress data links 308 through 310.

One example of cooperating links is the multicasting process. TDM traffic that is being received at the iMS 200 may be multicast over parallel backplane data links to a plurality of OPCs. Then each OPC may transmit the traffic to a different destination. Alternately stated, the iMS 200 multicasts the interleaved frame time slots on the plurality of cooperating dedicated backplane data links 208 through 210. In another example, the eMS 300 may receive a frame of TDM traffic and multicast the interleaved frame time slots on the plurality of cooperating dedicated egress data links 308 through 310.

In another example, the cellifier 102 may choose to transmit the first 10 cells from frame 1 on line 108 and the remainder of the cells on line 110. The iMS 200 has the capability of receiving the frame 1 cells on links 108 and 110 and transmitting all the cells from frame 1 on backplane data link 208, for example.

In some aspects of the system, the iMS 200 accepts and stores a plurality of TDM configuration schedules in memory 207. The iMS 200 selects a TDM configuration schedule for use in response to TDM clock signals. For example, the clock signals can be used to communicate a time at which a particular TDM schedule is to be enacted. The eMS 300 may also accept and store a plurality of TDM configuration schedules in memory 307. As above, the eMS 300 may select a TDM configuration schedule for use in response to TDM clock signals. Likewise, the arbiter 402 accepts and stores a plurality of TDM configuration schedules in memory 404, and selects a TDM configuration schedule for use in response to TDM clock signals. Typically, the iMS 200, eMS 300, and arbiter 402 simultaneously select a TDM configuration schedule. For example, the iMS 200, eMS 300, and arbiter 402 may simultaneously engage TDM schedules at 1:00 PM.

Returning to FIG. 1, the system 100 may further comprise a decellifier 150 having inputs 1 through m on lines 308 through 310 connected to the output port card 126 egress channels. The decellifier 150 deinterleaves the frame time slots, integrates the frame time slots into fabric-cellified TDM frames, converts the fabric-cellified TDM frames to native TDM frames, and transmits the native TDM frames at outputs 1 through n on lines 152 through 154. The decellifier 150 performs the reverse function of the cellifier 102. The values of m and n are not limited to any particular value. The decellifier may have inputs connected to other OPCs in the system 100, not shown.

Figure 6:
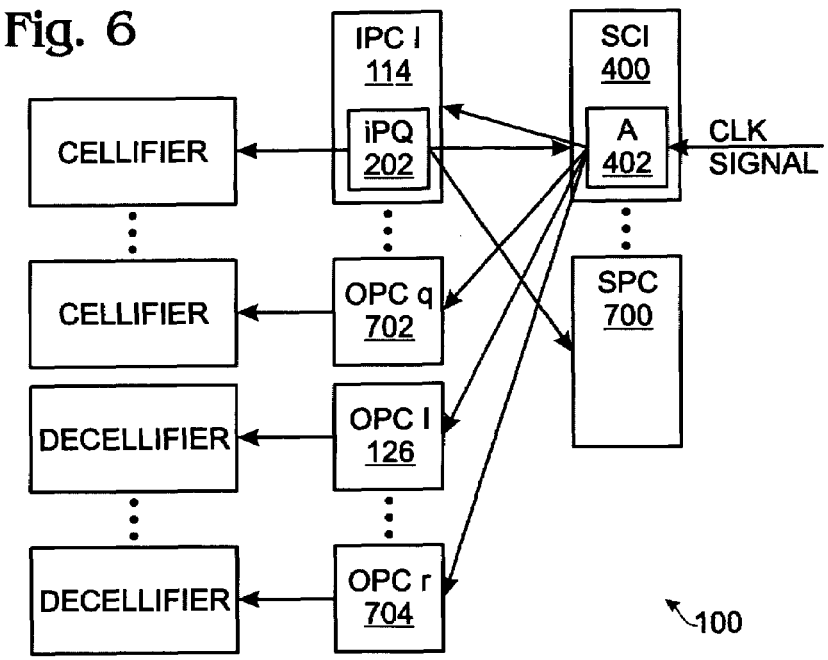
FIG. 6 is a schematic block diagram illustrating additional system details.

FIG. 6 is a schematic block diagram illustrating additional system details. Typically, as mentioned above, the system 100 includes a plurality of switch cards (SCs) 1 (400) through p (700), a plurality of IPCs 1 (114) through q (702), and a plurality of output port cards 1 (126) through r (704). A master switch card arbiter, arbiter (A) 402 for example, accepts the TDM clock signal and distributes it to the plurality of port cards 1 (114) through p (702) and 1 (126) through r (704). It should be understood that a port card may perform both ingress and egress functions. For example, IPC 114 and OPC 704 may be the same port card.

A master port card iPQ, iPQ 202 of IPC 114 for example, accepts the TDM clock signal and distributes it to the plurality of switch cards 400 through 700. Each input port card iPQ distributes the TDM clock signal to an interfacing cellifier. Likewise, each output port card iPQ distributes the TDM clock signal to an interfacing decellifier.

The above discussion also focused on the ability of the system 100 to manage TDM traffic. However, the system 100 is able to simultaneously manage both TDM and packet traffic. Returning to FIGS. 2, 3, and 4, the iMS 200 accepts packet traffic on lines 1 through s on lines 260 through 262 differentiated into packets and supplies packets on selected ingress backplane data links 1 through t on lines 264 through 266. The arbiter 402 enables backplane data link connections between the crossbars, the iMS, and the eMS on lines 264 through 266 and 360 through 362 in response to negotiating with input port card iPQ 212. The eMS 300 accepts packets on selected egress backplane data links 1 through u on lines 360 through 362 through an intervening crossbar and supplies packets on selected egress channels 1 through v on lines 364 through 366. The values of s, t, u, and v are not limited to any particular value. Additional details of the above-mentioned packet transfer mechanism can be found in SYSTEM AND METHOD FOR TOLERATING DATA LINK FAULTS IN A PACKET COMMUNICATIONS SWITCH FABRIC, invented by Clovis et al., Ser. No. 10/373,139, filed Feb. 24, 2003.

FUNCTIONAL DESCRIPTION

The present invention system described above is enabled, in one specific embodiment, as the S8005 Cyclone series; a highly integrated, low power, area efficient chip set that implements a high-capacity switching fabric that seamlessly handles both packet and TDM (Time Division Multiplexed) traffic. The switch fabric can process all types of packet traffic (ATM, MPLS, IP, etc.) equally well. The AMCC Cyclone switch fabric is based on a set of four highly integrated ICs which contain SERDES and memory in order to reduce the overall system power, routing complexity, and required board area. The chip set consists of the following chips:

S8505 Priority Queue (PQ)
S8605 Arbiter/Crossbar
S8805 Earliest Deadline First Queue (EDFQ)
S8905 Memory Subsystem.

Traffic management is integrated into the switch fabric and occurs at the ingress, switching, and egress in order to guarantee Quality of Service (QoS). The switch fabric is scalable and can terminate up to 128 OC-192's (1.28 Tbps). It can be organized as a 32×32 port switch where each port consists of four OC-192 channels, in effect implementing a 128×128 switch. The OC-192's can be either channelized or concatenated. The fabric can also be thought of as a 512×512 switch since each channel can be treated as four OC-48 subchannels. In addition to the port cards, there are up to 16 switching cards (depending on the chosen architecture and organization), which consist of Arbiters and Crossbars. Each switching card has connections to all the port cards.

Figure 7:
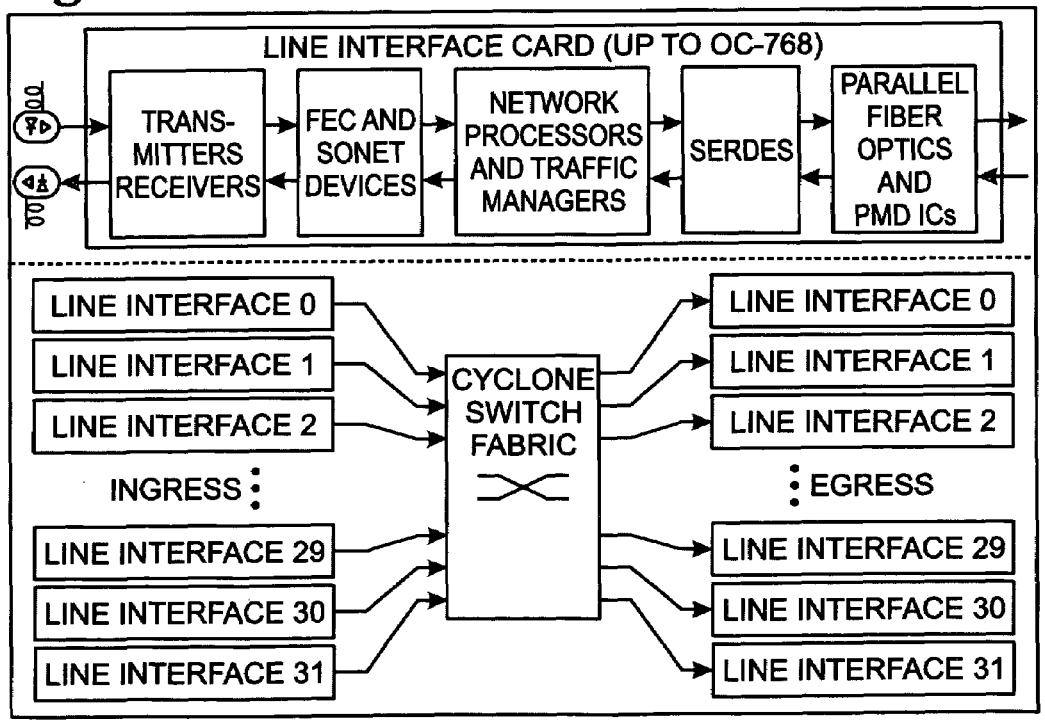
FIG. 7 is a system block diagram.

FIG. 7 is a system block diagram. The interface into the switch fabric carries one packet per serial link. All traffic is cellularized, whether it is TDM or best-effort type traffic. A link is either optical or electrical. Each channel of the switch fabric consists of up to 10 links.

TDM Traffic

The Cyclone switch fabric is architected to allow the seamless intermixing of TDM and non-TDM (packet) traffic. TDM traffic can be characterized as continuous, fixed bandwidth streams on a given source port destined to a fixed destination port or ports. The switch fabric provides a mechanism for pre-allocating backplane bandwidth for each TDM input, while allowing non-TDM traffic to fairly arbitrate for the remaining backplane resources. The switch fabric allows for TDM connectivity with granularity down to the STS-1 level (51.84 Mbps) within an STS-48 stream. The smallest provisionable amount of fabric bandwidth for TDM is OC-24 (one link's worth). Additional fabric bandwidth is also provisioned in OC-24 steps. TDM operation is explained below.

Cyclone TDM System Level Operation

Typically a SONET framer provides TDM traffic to the Cyclone switch fabric via an intermediate cellification chip that performs cellularization, and then streams the traffic to reserved TDM links on the ingress Memory Subsystem (iMS). As many as 8 iMS links per OC-192 channel may be reserved for TDM traffic. The iMS bypasses packet queueing and backplane arbitration for TDM traffic and streams directly to logically mapped backplane links.

Figure 8A:
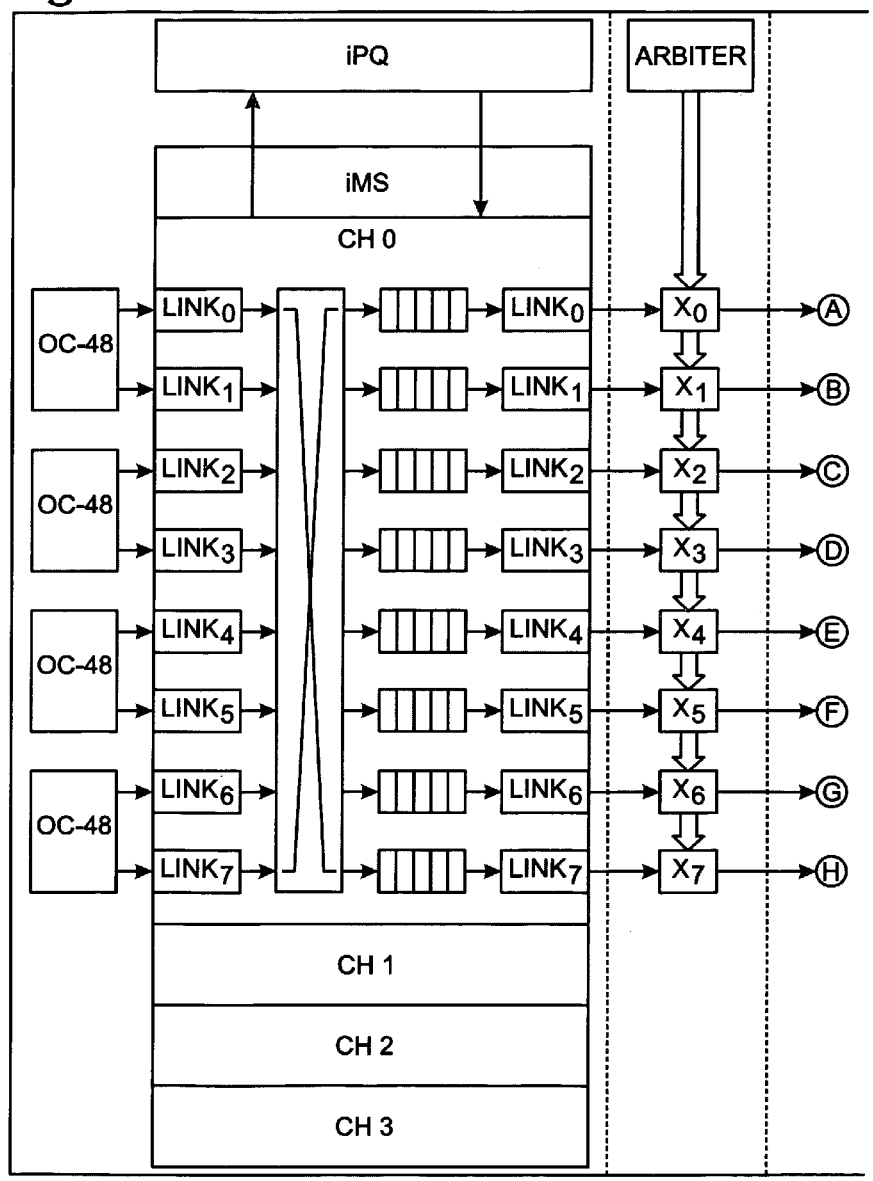
FIGS. 8A through 8C are a TDM switching flow diagram.
Figure 8B:
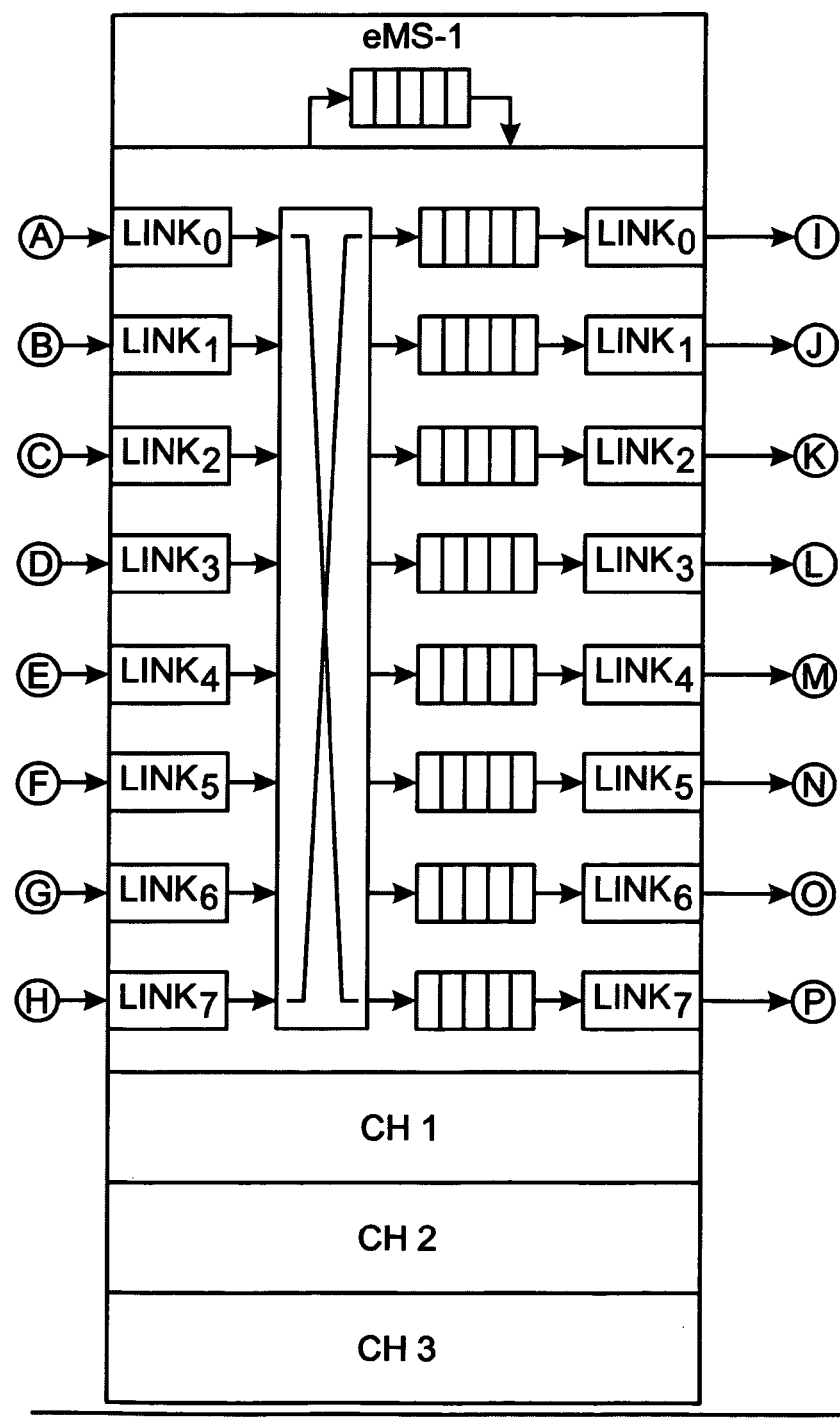
Figure 8C:
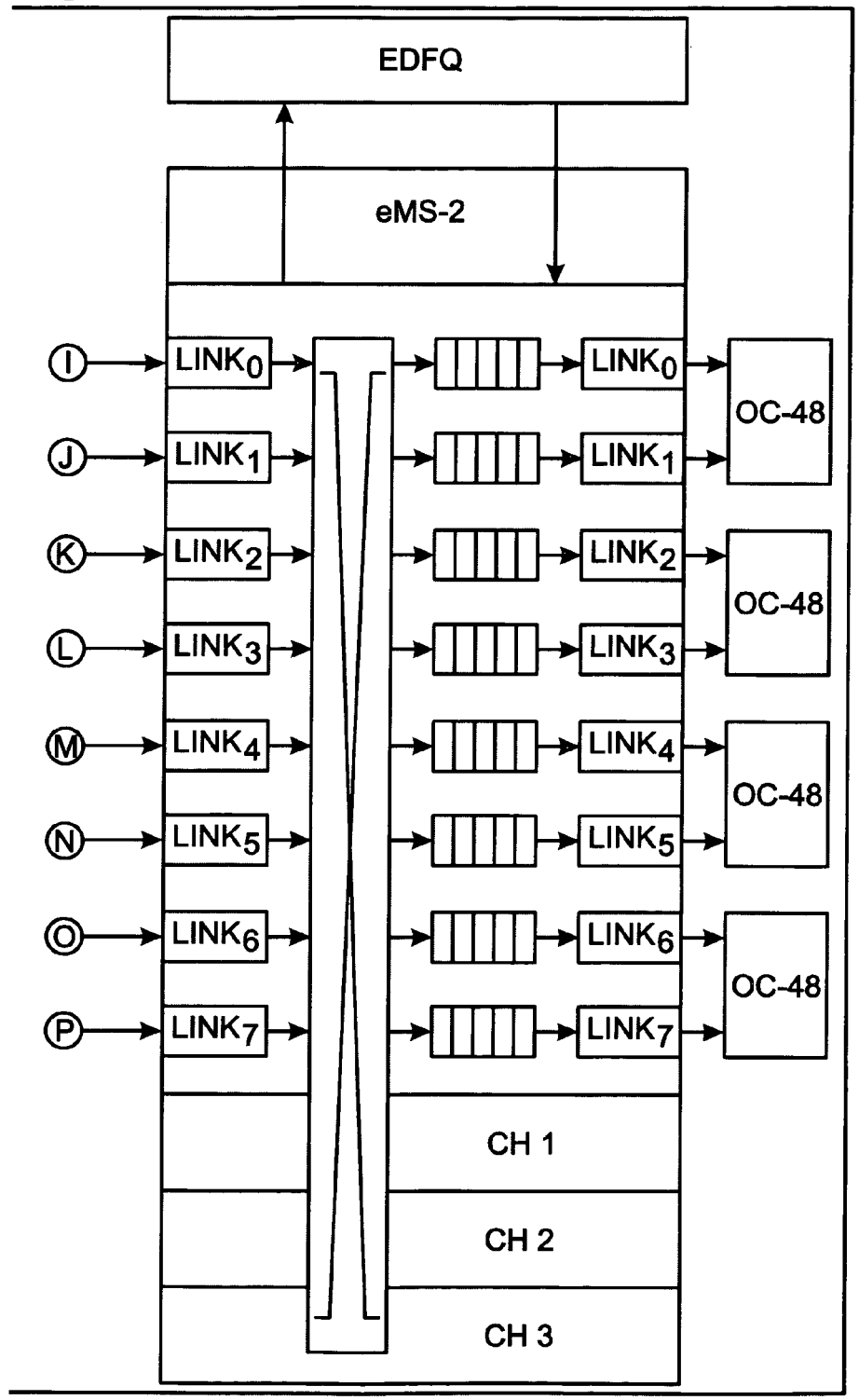

FIGS. 8A through 8C are a TDM switching flow diagram. The Cyclone switch fabric utilizes programmable TDM connection tables, which are used to create connection paths from any STS-48 subchannel input to any STS-48 subchannel output. It takes two links to create an OC-48 bandwidth subchannel. Like packet traffic, switching is performed in a two stage manner (at the port level and the channel level). The switch planes, each comprised of an Arbiter and several Crossbars, provide port level switching and TDM multicasting. The egress side of a port card, comprised of up to three S8905 Memory Subsystems and an S8805 EDFQ or S8505 PQ, provides channel and subchannel level switching and multicasting to the proper OC-192 channels and/or OC-48 subchannels. The EDFQ and PQ only have a scheduling role in best effort traffic, not TDM traffic.

The Arbiters do not receive connection requests for TDM traffic as they do for packet traffic. The connections are instead based on table values. Each Arbiter keeps a TDM table for each of its crossbars, mapping the port card to port card connections for TDM traffic at the switch plane. The Arbiters must also preclude packet traffic from getting access to TDM reserved links.

The egress Memory Subsystem (eMS) provides switching across the links of an egress port card. This is done through another programmable table that provides connection information for each input link (up to 8 per OC-192 channel) of the eMS. The content of the tables will be discussed in a following section.

STS-1 Granularity Switching

Figure 9:
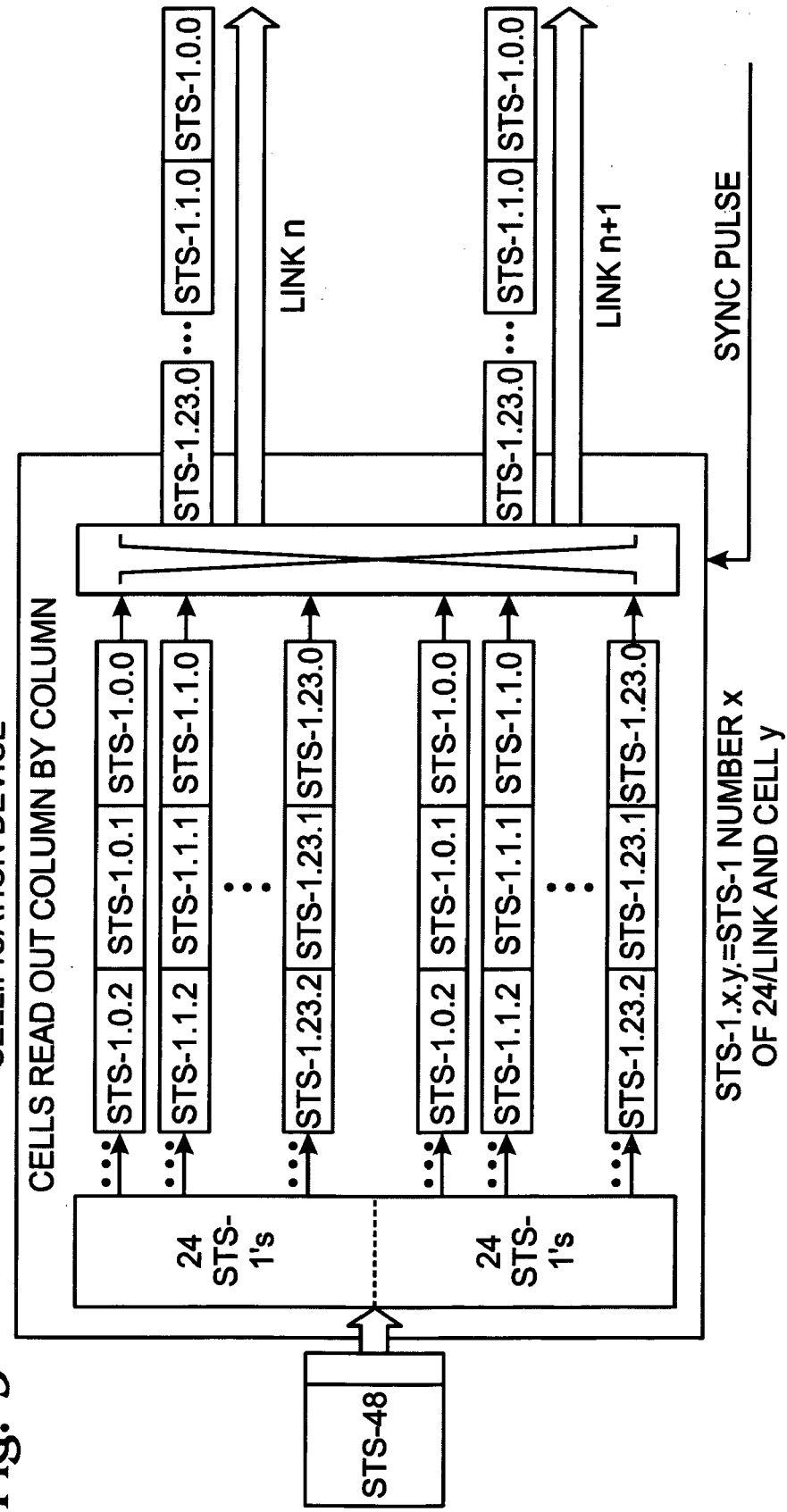
FIG. 9 is a diagram illustrating the cellification of STS-1 frames.

The Cyclone fabric allows fine grain switching of TDM traffic flows on each 2-link OC-48 subchannel connection. The traffic translates to 24 STS-1 frames of data per serial link at each MS and Crossbar link. Each STS-1 frame is divided into an integer number of Cyclone cells (for example: 21 64-byte cells) by a cellification device, which are transmitted on the TDM link in a time multiplexed fashion, serving STS-1.0.0, STS-1.1.0 to STS-1.23.0 and then repeating as shown in FIG. 9. STS-1.x.y represents the $x^{th}$ STS-1 frame of 24 on a link and cell y of the M cells required to cellify an STS-1.

FIG. 9 is a diagram illustrating the cellification of STS-1 frames. The links the cells are using are serviced in a round robin fashion every cell time (either 256 ns or 320 ns depending on the cell size) by the switch fabric. A Cyclone cell can contain a varying length of TDM payload and uses a payload length indicator to indicate the last utilized byte within the cell. For TDM flows that are not Digital Wrapper or STS-1's, the cellularizer will pad the cell payload with idle bytes where there are not sufficient payload bytes to fill the cell. The egress decellularizer can use FIFO watermarks to control an external PLL to recover the TDM timing.

For STS-1 and Digital Wrapper (DW) frames, the entire payload area of the cell would be utilized. When the cellularizer has not accumulated enough data to fill a cell, it will output an idle cell. The last cell of an STS-1 or DW frame will not be entirely utilized. In that case, the payload length indicator would indicate where the last utilized byte within the cell is. A cell must not contain data from two adjacent STS-1 frames or DW subframes. The cellification process must pad the Cyclone cell payload at the frame boundary and start the new frame on the next Cyclone cell.

The Arbiter and egress MS keep connection values for each STS-1, allowing up to 24 independent connection values per link before repeating. To support this, each TDM table stores up to 24 separate connection values per link, which are accessed in a round robin fashion to determine connectivity.

Figure 10:
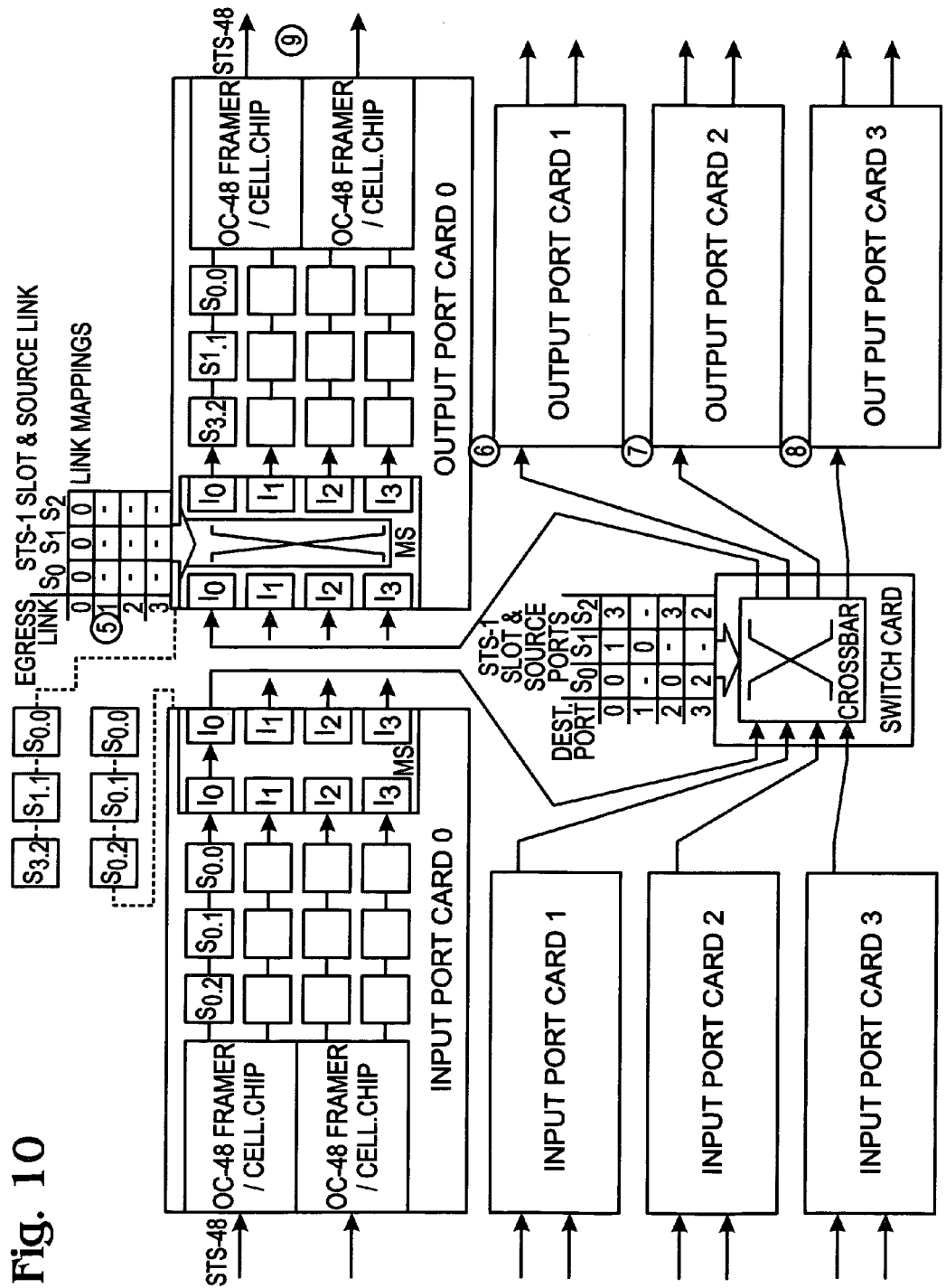
FIG. 10 shows a simple example of STS-1 level TDM switching.

FIG. 10 shows a simple example of STS-1 level TDM switching. To simplify the diagram, the example shows only 4 port cards with 2 framers each. Each MS shown is using only four of its links, and only a single Crossbar is fully drawn. The figure shows 3 independent STS-1 data streams (denoted by $S_{x.0}$, $S_{x.1}$ and $S_{x.2}$, where x is the source port card and the second digit represents which STS-1 of 24 it is) per link. Which cell number of the STS-1 is represented is immaterial since all cells within a particular STS-1 are treated the same. The $S_0$, $S_1$ and $S_2$ STS-1's are also commonly referred to as STS-1.0, STS-1.1 and STS-1.2, respectively, throughout this explanation. The following explains in a step-by-step manner how TDM flows through the fabric.

In FIG. 10, STS-48 SONET/SDH frames arrive at the ingress framer. Individual STS-1 streams are extracted and cellified by the cellification device and are forwarded to the Cyclone fabric in an interleaved fashion. The ingress MS maps the ingress TDM links to outgoing backplane links. The links used to carry data to the backplane are independent of the links the data arrives on. The mapping is programmed a priori. All MS outgoing link 0s are connected to the Crossbar.

All STS-1.0.x cells from the different port cards arrive at their Crossbars simultaneously. The connection table shows the mapping for all crossbar output ports, per STS-1 time slot. For each destination port, there is a row indicating which ingress port to take each STS-1 from. For example, for output port 0, STS-1.0 comes from input port 0, STS-1.1 comes from input port 1, and STS-1.2 comes from input port 3. For output port 1, there is nothing placed into the STS-1.0 slot. STS-1.1 comes from port 0, and STS-1.2 again is not filled. Notice that STS-1.0 from input port 0 is being multicast to output ports 0 and 2. STS-1.1 and STS-1.2 have completely unrelated connection values.

The switched cells arrive at each destination port according to the Arbiter's TDM table's connection values. Items 5-8 show a backplane link to egress link remapping of the STS-1's at the egress MS. For egress port card 0, a direct mapping of all input link 0s to output links 0s (5) is performed. On output line card 1, input link 0 is broadcast to all output links for STS-1.1 (6). Output port card 2 demonstrates channel multicast combinations (7). Output port card 3 demonstrates full input link arrivals from all four crossbars (crossbars 1-3 not shown), with mappings from all four filling in all the slots on the MS outgoing links (8). Note that the input port indicators in the STS-1's are numbered A-C to distinguish them from the cells used in the previous parts of the example. The ingress arrival port card has no bearing on the mapping at the egress MS. Finally, cells are accumulated at the egress cellification chips and re-concatenated at the framer to form an outgoing OC-48 frame (9).

The Cyclone fabric provides four fully programmable switching configuration tables to allow for simultaneous switching while the microprocessor programs the next configuration. This is accomplished by use of multiple tables in both the Arbiter and the eMS. The choice of TDM switch configuration is explicitly microprocessor programmed.

Synchronization and Timing

Any TDM flow can be passed through the Cyclone fabric and have its timing recovered on the egress side using an external PLL; however, to perform STS-1 grooming across multiple system ports, the switch fabric and line cards must be frequency locked and frame synchronous. Additionally, for glitch-free switching and to avoid framing loss, the switch reconfiguration must be coordinated and changed only on SONET/SDH or DW (Digital Wrapper) frame boundaries.

In order to achieve this, a central timing reference is required. Typically, the timing for the switch fabric and the timing for the line cards is an integer multiple of some common base frequency. This is usually an 8 kHz frame rate derived from a GPS reference, a Buildings Internal Timing Source (BITS), or recovered from an OC-n line interface. The 8 kHz clock would be used as a frame synchronization signal by the pointer processors, cellification chips, and other devices that need to be synchronized for TDM switching.

Figure 11:
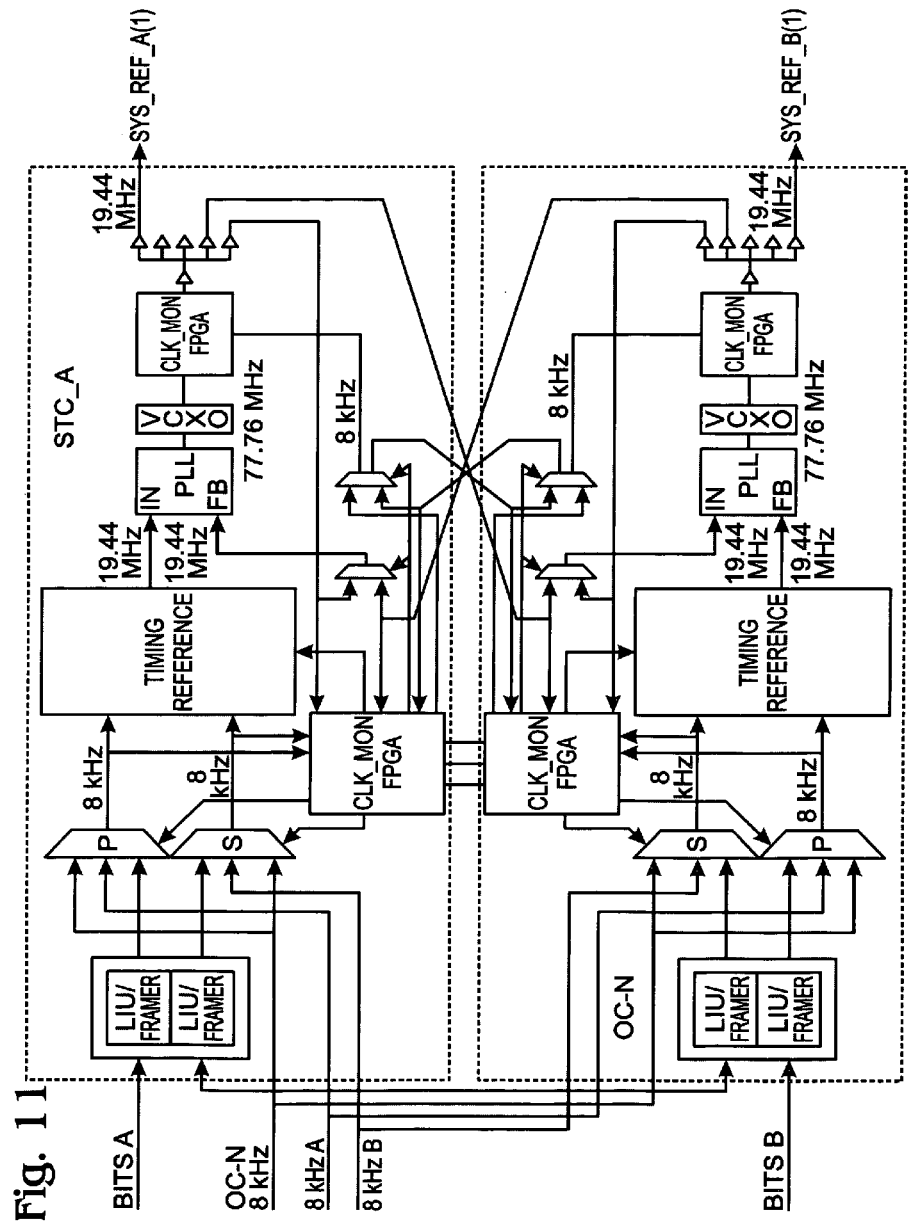
FIG. 11 shows a typical centralized clock source recovery and distribution block diagram with redundancy.

FIG. 11 shows a typical centralized clock source recovery and distribution block diagram with redundancy. An 8 kHz clock is distributed to all line cards and switch fabric cards in the system. The line cards and switch cards then synthesize higher rate clocks from the 8 kHz distribution. System synchronization is achieved at the 8 kHz base rate.

Device TDM Functions

Framing and Cellification

The framer prior to the cellification device performs section, line, and possibly path termination functions before transmitting SONET/SDH data to the cellification device. For STS-1 level switching, a pointer processor is required to frequency adjust and frame synchronize the SONET/SDH timing domain to the switch fabric timing domain. For all other TDM flows, including SONET/SDH that may not be pointer processed for STS-1 level grooming, the cellification device will rate adapt the incoming TDM stream using a FIFO and variable length cells to account for rate differences between the incoming TDM stream and the fabric's cell rate.

Figure 12:
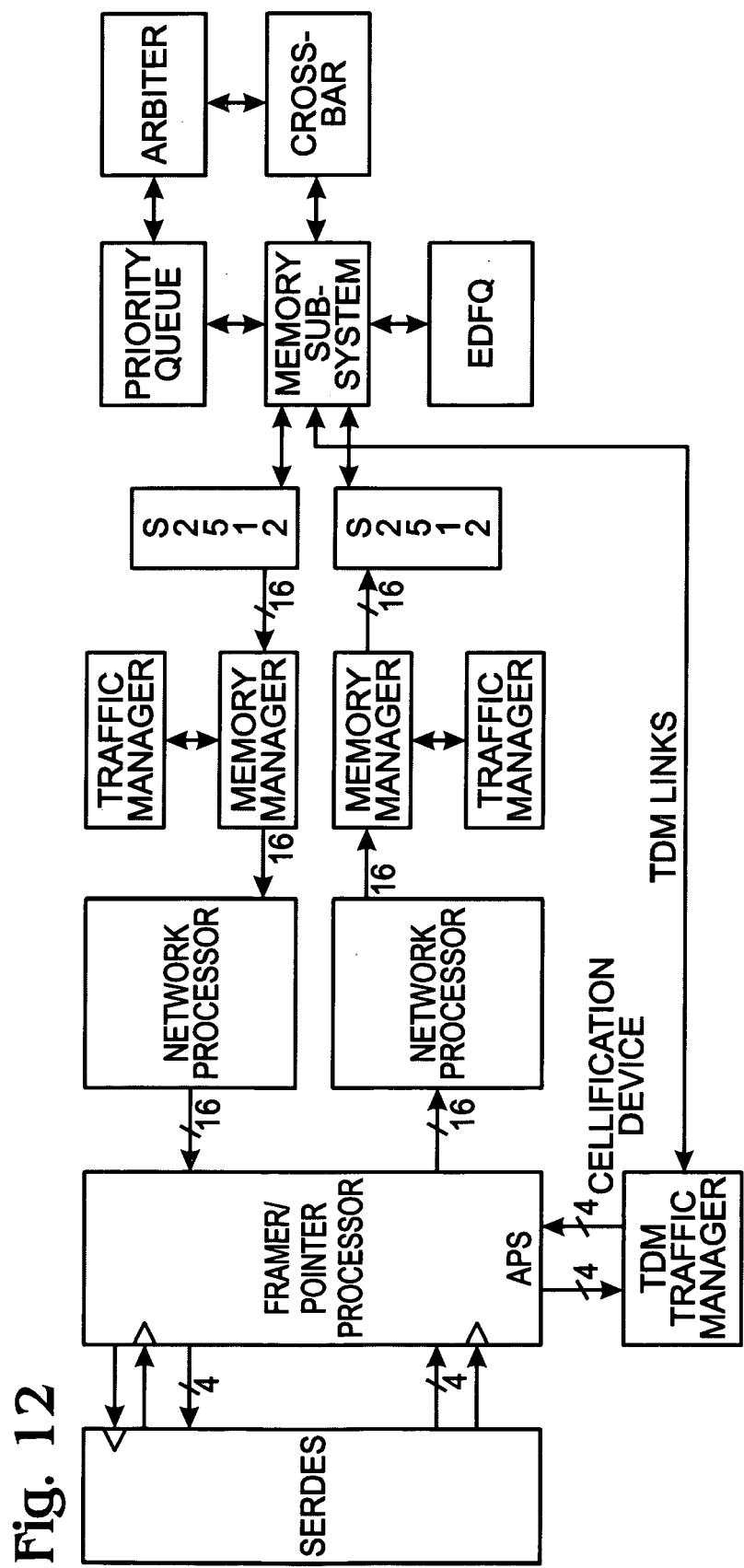
FIG. 12 shows a high-level block diagram of an STS-48 SONET/SDH stream interfacing to the switch fabric.

FIG. 12 shows a high-level block diagram of an STS-48 SONET/SDH stream interfacing to the switch fabric. TDM timing recovery at the egress cellification device is accomplished using FIFO watermarks which control an external PLL. Data cells or packets are processed through the framer system interface, network processor, and data traffic manager prior to entering the switch fabric; where as TDM flows within the STS-48 stream are dropped out the framer's TDM port to the cellification chip for TDM traffic management.

The fabric assumes up to 24 STS-1's per ingress link coming from the cellularizer. For sub-STS-24 level switching (down to STS-1) to be performed by the switch fabric, the cellification chip is required to split out the finer STS-1 data streams so they can be independently switched. The cellification device would send each STS-1 to an independent FIFO, perform STS-1 time slot interchange functionality as programmed, and places the data in Cyclone cell format. A new cell would be formed every 256 ns or 320 ns depending on the chosen cell size. The FIFOs are serviced in a round robin TDM fashion, but not necessarily in sequential order, such that STS-1 time slot exchanges could be performed.

Figure 13:
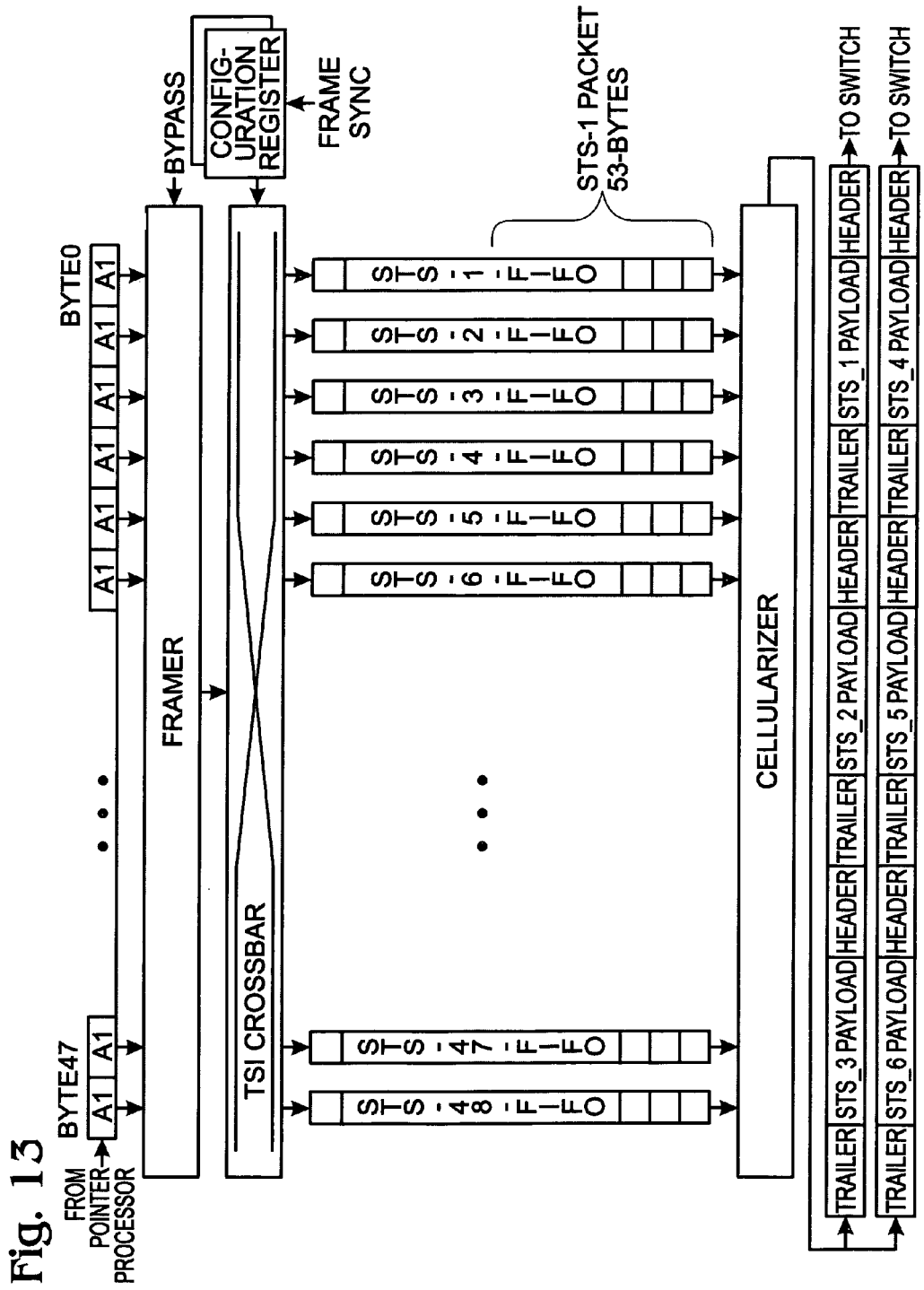
FIG. 13 illustrates a functional block diagram of cellularization.

FIG. 13 illustrates a functional block diagram of cellularization. At the ingress to the cellification chip, framing is done for either SONET/SDH or Digital Wrapper traffic. For other TDM streams, the framing function would be disabled and data simply clocked in using an external CDR. SONET/SDH and DW framing is accomplished by monitoring the serial stream for the A1/A2 (0xF268) bytes. The cellification chip declares "in frame" when it has found the last A1 byte followed by 2 A2 bytes for three consecutive frame intervals (note that a SONET/SDH frame interval is different from a DW frame interval and must be register provisioned).

Once framed, the cellularizer chip deinterleaves the SONET/SDH stream into its constituent STS-1 FIFOs. For DW, the FIFOs should be organized into 16 subframe FIFOs. For all other TDM streams, a single FIFO would be used. SONET/SDH and DW overhead bytes should be transparently mapped into the STS-1 or subframe FIFOs. Bytes are removed from the FIFOs in 53 or 69 byte chunks, are 8B/10B encoded, and mapped to Cyclone formatted 64 or 80 byte cells respectively. To eliminate STS-1 level blocking in the core switch, STS-1 cells may need to be removed from the STS-1 FIFOs in a round-robin, but out of order fashion. A Time Slot Interchange (TSI) crossbar and configuration register are used to set the sequence of the STS-1 slots.

For non-SONET/SDH or DW TDM flows, bytes are removed from the FIFOs in a round robin fashion. Watermarks would indicate when there is sufficient data in the FIFOs to be cellularized. When insufficient data is present, an idle cell would be inserted, thus rate adapting the TDM stream to the switch fabric's cell rate.

Cellularization includes attaching a Cyclone formatted header and trailer around the TDM bytes. A start of frame marker in the first cell, and end of frame marker along with a payload length field in the last cell of an STS-1 frame are also necessary.

The ingress Priority Queue (iPQ) provides an STS-1 level link synchronization pulse which the cellification chip uses to determine the correct STS-1 FIFO to service. The cellification chip should keep a programmable offset counter to allow variable delay from the link sync pulse to STS-1.0. When creating cells, the cellification chip must guarantee that STS-1 frames are not mixed within a cell so as to allow STS-1 switching granularity.

Ingress Memory Subsystem

The Memory Subsystem provides 2.5 Gbps serial links to the cellification device, cell buffer space for non-TDM ingress and egress queues, and serial links to the backplane. An MS would perform different TDM functions depending on its location (ingress or egress) within the system.

The links entering the ingress Memory Subsystem (iMS) are defined to be either TDM carrying links or non-TDM links. TDM traffic links are treated differently than non-TDM links. Non-TDM traffic is buffered and packet IDs (PIDs) are forwarded to the PQ where they would be scheduled for transmission over the backplane. TDM cells, on the other hand, have their PIDs placed in dedicated TDM FIFOs on board the MS. There is one TDM FIFO for each TDM output link. The TDM input links are mapped to TDM backplane links. The link mappings are microprocessor programmed, but remain static for the duration of TDM traffic. TDM cells are automatically dequeued from the FIFOs and always override any erroneous PID requests from the iPQ.

Ingress Priority Queue (iPQ)

The ingress Priority Queue is responsible for maintaining synchronization between the Arbiter and the port cards so that the STS-1 TDM table accesses are synchronized between them. The Arbiter and iPQ maintain STS-1 level synchronization using in-band communication in the bid/grant packets. The iPQ maintains an STS-1 counter, providing sync signals to the cellification chip and second stage egress Memory Subsystem upon rollover.

The queue chips do not queue or schedule TDM cells, but must keep track of which output links are TDM so as not to schedule non-TDM cells on them.

Arbiter

Figure 14:
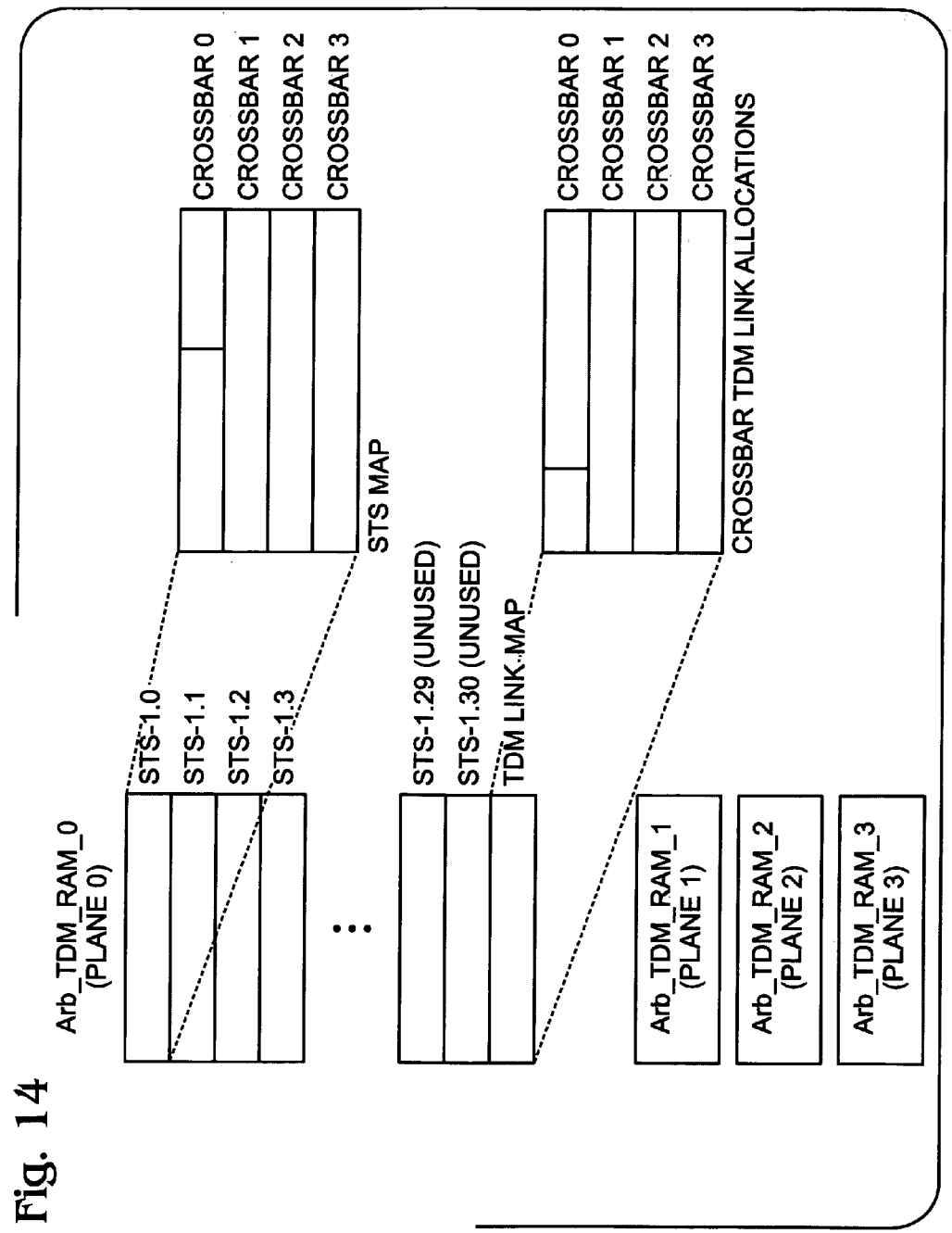
FIG. 14 illustrates the memory map for the Arbiter TDM connection table.

The Arbiter is responsible for switching and multicasting TDM cells across port cards and keeping track of the STS-1 cell index within a link. The Arbiter creates connections between port cards and performs multicasts by creating connections in the crossbars. The Arbiter has a TDM table, which defines what connections to create and when to create them. The TDM table consists of 4 independent configurations (switch planes), as shown in FIG. 14, that define the connections to create for each TDM link of each Crossbar. The Arbiter switches tables at the next rollover of the STS-1 counter from STS-1.23 to STS-1.0 after a 'TDM plane switch' command is received. It does an automatic switch to the programmable 'next plane'. The Arbiter and PQ maintain synchronization with each other using information in the bid and grant packets. An 8 kHz reference pulse is provided to the pointer processors and the Arbiter to establish a common reference point for the system to establish the STS-1.0 location.

The Arbiter's TDM table has an entry for a port connection for each link of each crossbar for each STS-1 connection within a link, times four connection planes. This is 32 links×4 crossbars×24 STS-1/link×6 bits/entry×4 planes=72 Kbits. The Arbiter accesses this table in a round robin fashion for each link, repeating every 24 entries.

The Arbiter allows TDM and non-TDM traffic to share the same crossbar. This is accomplished by reserving TDM links and precluding these links from the maximal matching arbitration done for the non-TDM links. Which links are TDM are stored in the TDM Link Assignments table in unused time slot STS-1.31 as shown in FIG. 14. This table would contain a '1' in every position representing a link (whether input or output) that is dedicated to TDM.

For the TDM links that have been defined, the Arbiter would then use the connection information stored in the STS-1.x entries to determine the input to output mappings based on link number and time slot. Each row of an STS-1.x entry contains the connectivity for four Crossbar outputs. The data for each output would consist of the input port connected to that specific output (5 bits) and a valid bit.

FIG. 14 illustrates the memory map for the Arbiter TDM connection table. The entries in the Arbiter's TDM tables are protected by a single error correcting, double error detecting (SECDED) code.

Crossbar

The Crossbar is responsible for the connections between ports. It is at the Crossbars that port level TDM multicasts occur as programmed by the Arbiter. The Crossbar has no extra functionality to address TDM traffic.

Stage 1 Egress Memory Subsystem (eMS1)

Figure 15:
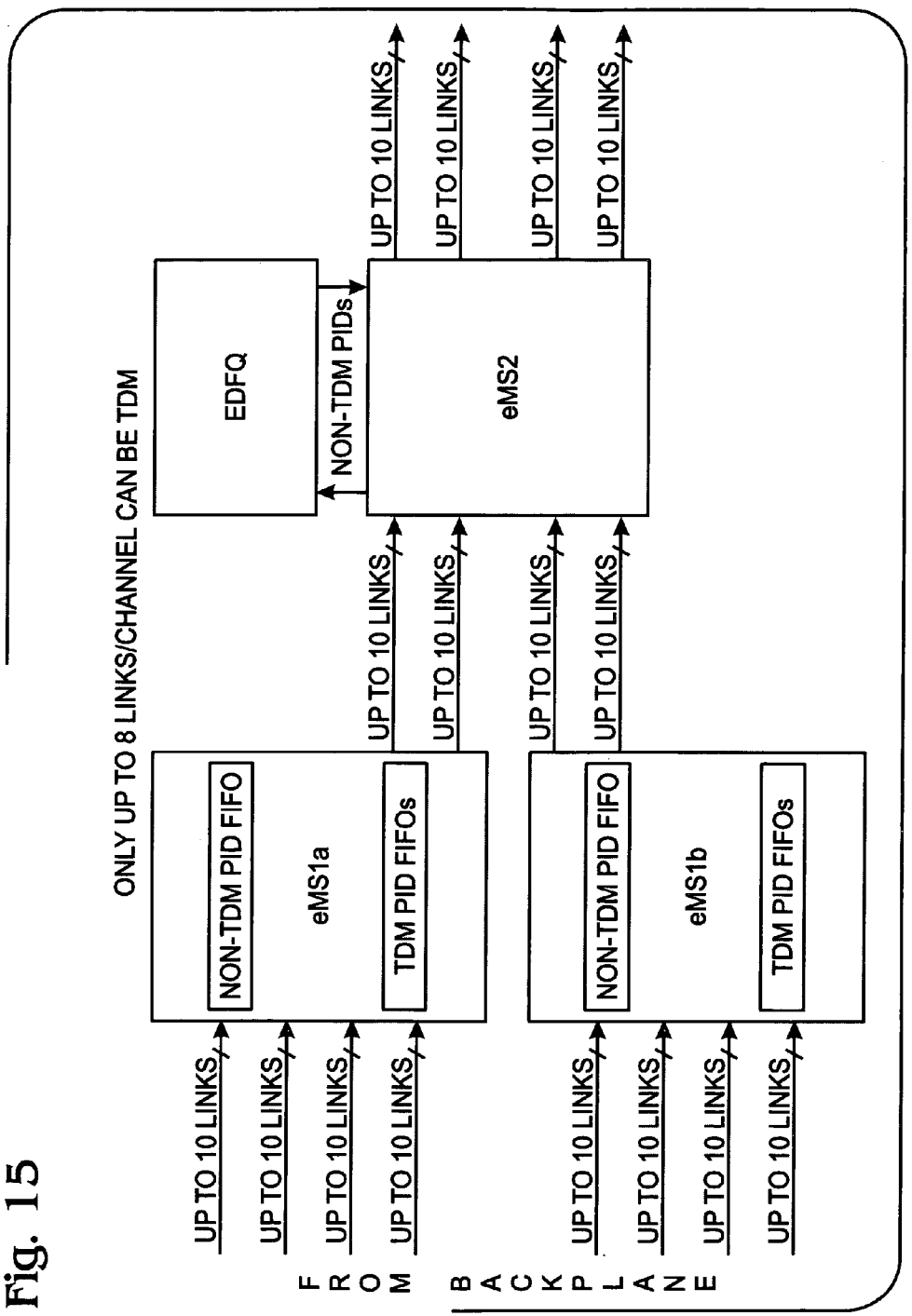
FIG. 15 illustrates an egress MS arrangement.

FIG. 15 illustrates an egress MS arrangement. In a 4-channel system, there are two stages of Memory Subsystems on the egress side. The first stage, egress MS treats cells arriving on defined TDM links differently than non-TDM cells, similar to the way the iMS does. Non-TDM cells are buffered and their PIDs are forwarded to an internal general PID FIFO. TDM cell PIDs are placed in a dedicated TDM FIFO for the mapped second stage link. Link mappings are microprocessor programmed, but remain static for the duration of TDM traffic. TDM cells are then auto-dequeued to the dedicated TDM second stage links.

Stage 2 Egress Memory Subsystem (eMS2)

In the case of a single channel system, only the eMS2 would be on the egress side. The eMS2 also treats cells arriving on defined TDM links differently than non-TDM cells. While non-TDM cells are buffered and their PIDs are forwarded to the EDFQ or oPQ, TDM cell PIDs are placed in a dedicated TDM FIFO for the mapped egress link. Link mappings are stored in microprocessor programmable table. The table contain a 32-bit map for each STS-1 level connection on each possible link for four connection planes. This requires 4 bytes×24 STS-1/link×32 links×4 planes=12 Kbytes.

TDM cells are auto-dequeued to dedicated TDM egress links, and always override any erroneous PID requests from the queue chips for those links. An STS-1 TDM sync pulse is sent from the ingress PQ to provide a synchronization point for table access. A microprocessor programmable pre-load register allows a variable offset from the sync pulse to the primary table restart.

The eMS2 incorporates four switch tables to allow programming of one table while another is executing. The MS contains registers to specify which one of the four tables is the primary and which is the next to be used. It will switch to the next table when instructed to do so by the iPQ and when its STS-1 counter rolls over to the next STS-1.0 frame.

Figures 16, 18:
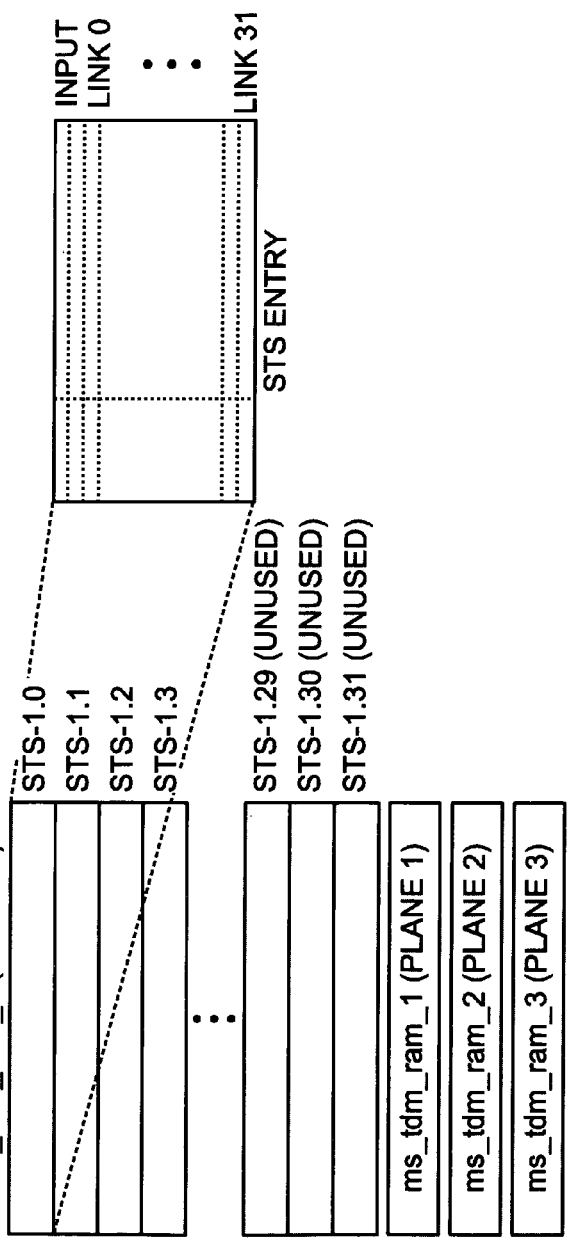
FIG. 16 illustrates the memory map for the Memory Subsystem TDM connection table.
FIG. 18 is a diagram illustrating time signal propagation.

FIG. 16 illustrates the memory map for the Memory Subsystem TDM connection table. Each entry in the table is protected by a single error correction, double error detection (SECDED) code to avoid mis-routing TDM cells. The table is broken into 4 switching planes with each switching plane having room to describe the connectivity for 24 STS-1's. Each STS-1 entry describes how each STS-1.x should be treated on each incoming link. The 32-bit output link mask for each input link allows the TDM traffic to be multicast to multiple links and channels on the port card. For example, an entry of 00 00 00 F0 hex for link 0 and STS-1.0 would direct eMS2 to take the STS-1.0 arriving on link 0 and multicast it to links 4, 5, 6, and 7.

Egress Framer and Cellification Device

Figure 17:
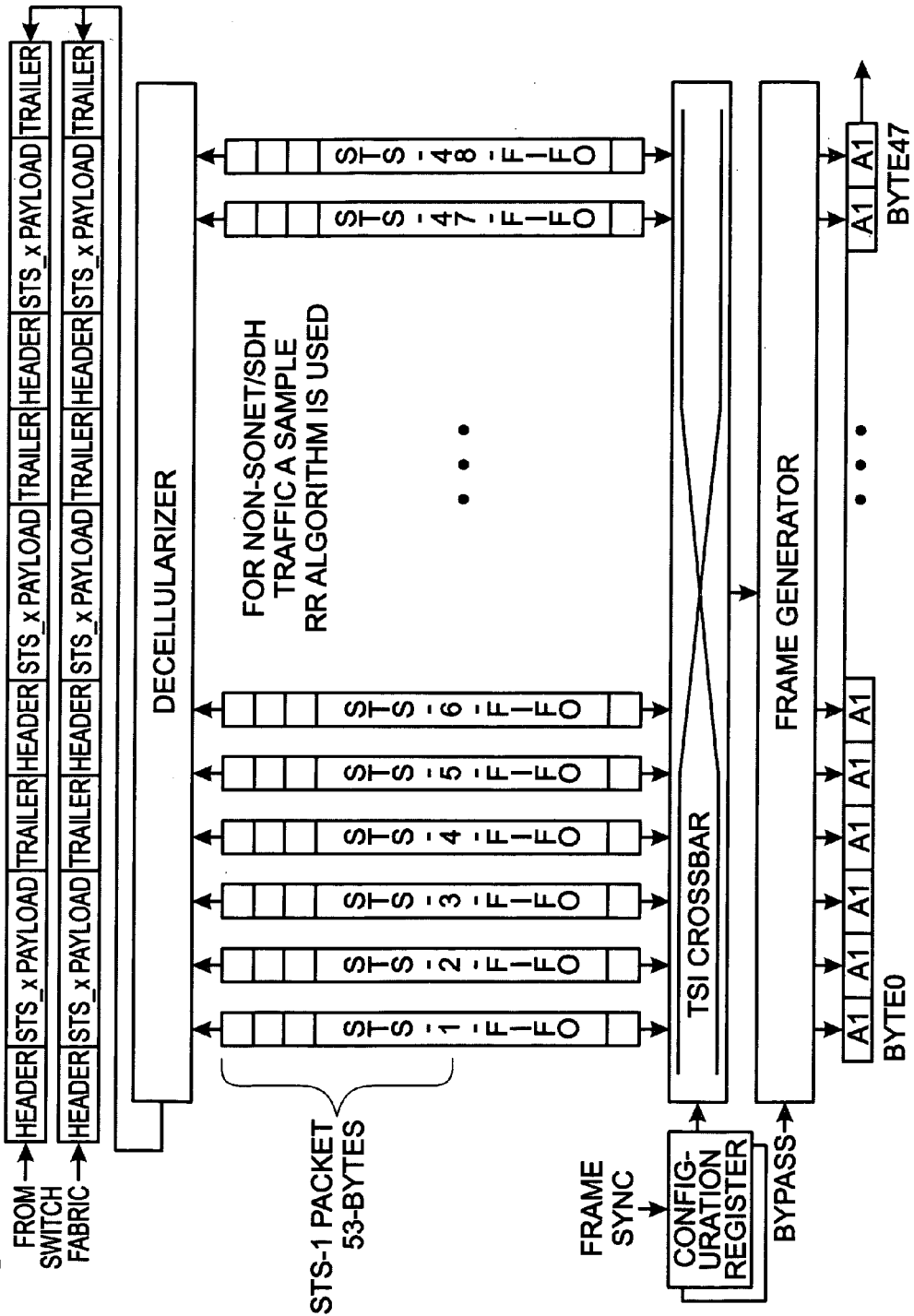
FIG. 17 illustrates the inverse cellification (decellification) process that occurs at the egress side of the switch fabric.

FIG. 17 illustrates the inverse cellification (decellification) process that occurs at the egress side of the switch fabric. Serial STS-1 or DW cells arriving from the switch fabric are monitored for errors, 8B/10B decoded, and placed into their corresponding FIFOs. The cell stream header contains a frame marker which indicates the start of a SONET/SDH frame or DW superframe. Bytes from the first STS-1 or DW cell are placed into the STS-1.1 FIFO and subsequent bytes from sequential cells are placed in FIFO order. A TSI crossbar and configuration register can be available in the decellification device to reorder the STS-1's into the outgoing SONET/SDH frame. This may be required since the STS-1's may not necessarily be ordered properly if they were conditioned by the ingress cellularizer to eliminate blocking through the fabric's crossbars, and they were port mapped by the switch fabric. B1 (BIP-8) can also be optionally recalculated on the outgoing SONET/SDH or DW frame.

For non-SONET/SDH or DW traffic, the egress FIFOs would be unloaded in a round robin manner. FIFO watermarks can be used to control an external PLL to recover the TDM timing.

EDFQ/oPQ

The output queues do not queue or schedule TDM cells. The only item they must be programmed with and keep track of is which links are TDM so they do not schedule non-TDM cells on those links.

TDM Plane Switching

The MS and Arbiter contain 4 TDM tables that can be selected from. The process of switching tables is triggered by the ingress framer or cellification chip. It is a multistage process that ensures a hitless reprovisioning across all the affected line cards.

The framer or cellification chip would detect a switch over condition or a request for reprovisioning and signal this information so another device can detect it. The line card microprocessor would detect this information and inform its designated Arbiter, via its token ring connection through the MS, that a TDM plane switch has been requested. The switch card's microprocessor would get the request from its Arbiter and pass it along to a system processor that would be responsible for the provisioning and reprovisioning of TDM traffic.

The system processor, based on the various requests it may have gotten, may recalculate the TDM paths through the fabric or select one that may already be programmed in the tables. In the case that new tables are calculated, the affected chips would need to be updated. The system processor would select an inactive table in each chip to be the next active table and download that information along with the new tables to the appropriate switch card processors. The switch card processors would then update the chips they are responsible for via their respective token rings. Once all the updating is done, the chips are ready to begin the plane switch process.

FIG. 18 is a diagram illustrating time signal propagation. The system processor, after getting an acknowledgement that all the affected ICs have been configured, sends a "start TDM switch" command to the master Arbiter (step 1 in FIG. 18). The master Arbiter is the Arbiter responsible for system synchronization. The master Arbiter waits for some programmable delay after the Frame Sync to prevent rollover from occurring in the middle of a SONET frame. The delay should place the trigger after the start of the LAST cell of STS-1.0. The master Arbiter will then send out switch commands in 3 sequential grant packets to all its attached PQs (step 2). The PQs then propagate the switch command to their Memory Subsystems, cellification devices, and other iPQs if present. The second iPQ on the master iPQ's line card, if present, and the master iPQ then pass the switch command to all of their attached Arbiters (step 3). They do this in 3 sequential bid packets. In this manner, all the cards in the system are informed of the TDM plane switch and will carry it out at their next STS-1 count rollovers.

All chips involved in the provisioning will set a "TDM_Switch_Detect" status bit after they have switched over to indicate that a valid switch occurred. The system processor can then collect this information to verify that the switch over occurred correctly.

Figure 19A:
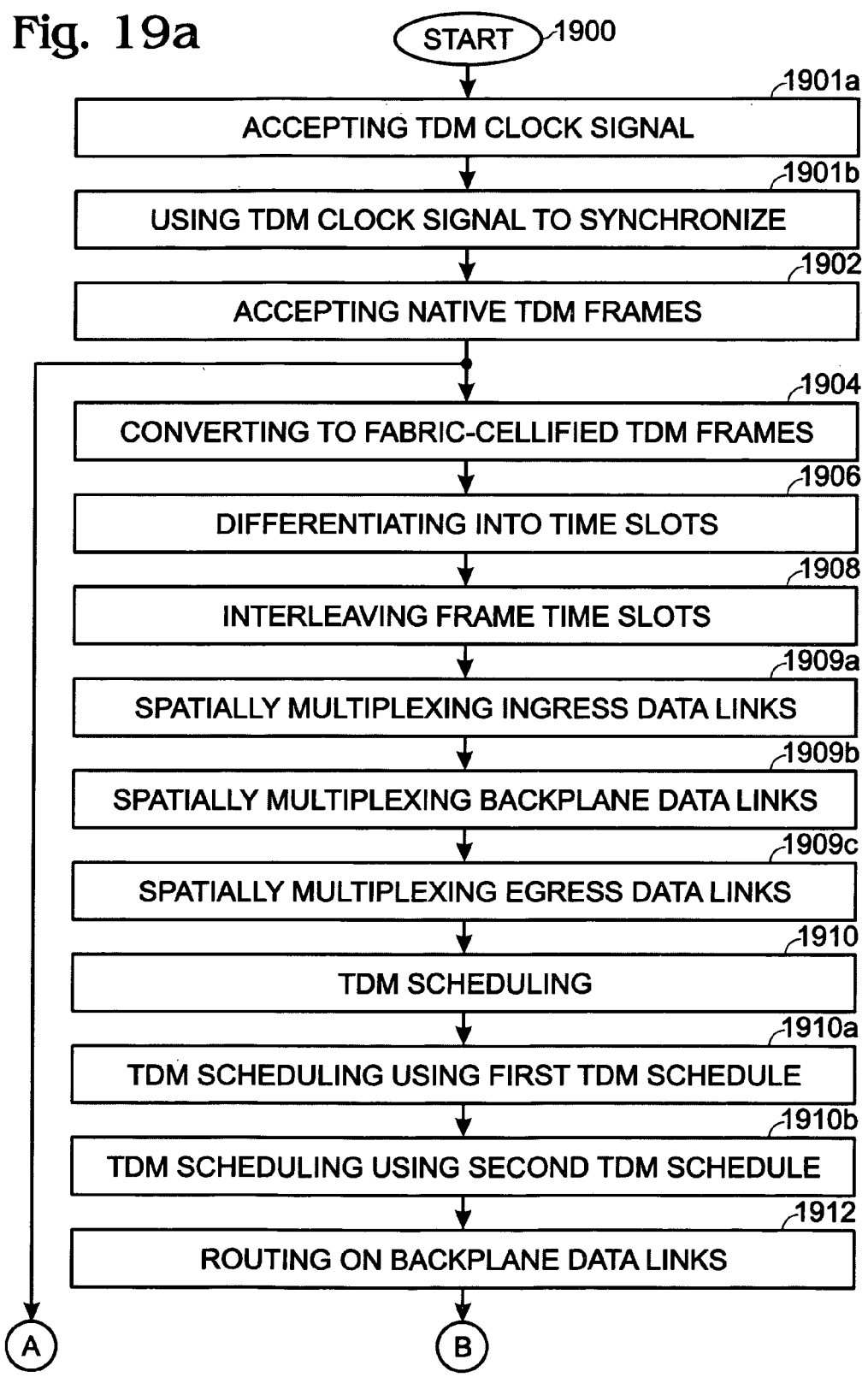
FIGS. 19*a* and 19*b* are flowcharts illustrating the present invention method for communicating time division multiplexed (TDM) communications through a packet switch fabric.
Figure 19B:
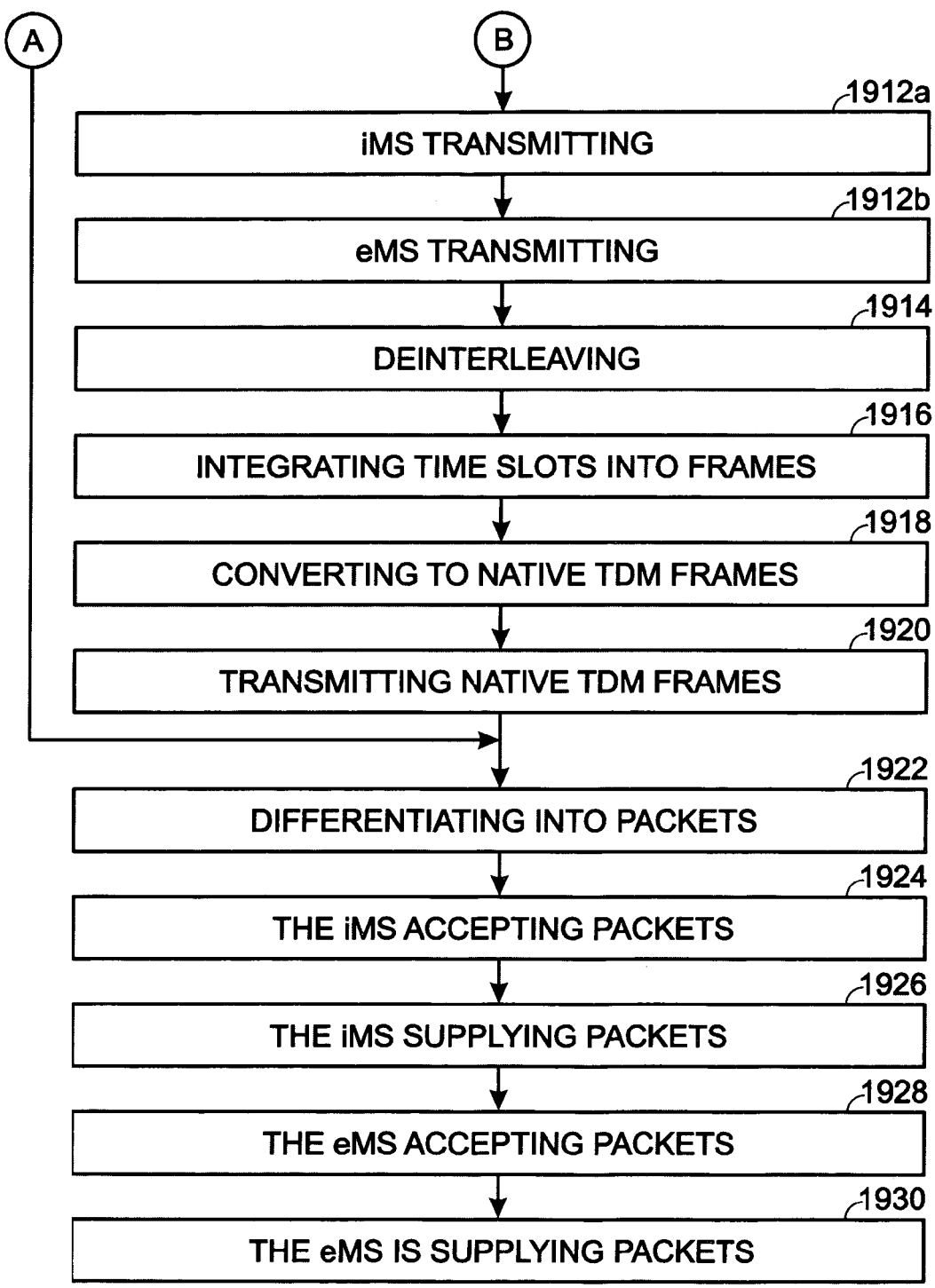

FIGS. 19a and 19b are flowcharts illustrating the present invention method for communicating time division multiplexed (TDM) communications through a packet switch fabric. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 1900.

Step 1902 accepts native TDM frames. For example, SONET or Digital Wrapper frames can be accepted. Step 1904 converts the native TDM frames to fabric-cellified TDM frames. Step 1906 differentiates the cells of each frame into time slots. Step 1908 interleaves the frame time slots. Step 1910 TDM schedules the interleaved frame time slots. Step 1912 routes the interleaved frame time slots between input port cards and output port cards on backplane data links through an intervening crossbar.

In some aspects of the method, TDM scheduling the interleaved frame time slots in Step 1910 includes substeps. In Step 1910*a* an input port card ingress memory subsystem (iMS) receives a first TDM configuration schedule including interleaved frame time slots cross-referenced to backplane transmission times. In Step 1910*b* an output port card egress MS (eMS) receives a second TDM configuration schedule including interleaved frame time slots cross-referenced to egress channel transmission times. Then, routing the interleaved frame time slots between input port cards and output port cards on backplane data links through an intervening crossbar in Step 1912 includes substeps. In Step 1912*a* the iMS transmits interleaved frame time slots on backplane data links to the eMS in response to the first TDM configuration schedule. In Step 1912*b* the eMS transmits interleaved frame time slots on egress channels in response to the second TDM configuration schedule.

In some aspects a further step, Step 1901*a* accepts a TDM clock signal. Step 1901*b* uses the TDM clock signal to synchronize the first and second TDM configuration schedules, the interleaving of the frame time slots, and the routing of interleaved frame time slots on backplane data links through an intervening crossbar.

In other aspects, routing information packets between port cards on backplane data links through an intervening crossbar in Step 1912 includes additional substeps (not shown). In Step 1912*c* a crossbar arbiter receives a third TDM configuration schedule including interleaved frame time slots cross-referenced to backplane transmission times. In Step 1912*d* the arbiter enables backplane data link connections between the crossbar and the port cards in response to the third TDM configuration schedule.

In some aspects, the iMS transmitting interleaved frame time slots on backplane data links to the eMS in response to the first TDM configuration schedule (Step 1910*a*) includes substeps not shown. In Step 1910*a*1 the iMS accepts the interleaved frame time slots. In Step 1910*a*2 the iMS buffers the interleaved frame time slots. In Step 1910*a*3 the iMS provides interleaved frame time slots to selected ingress backplane data links in response to the first TDM configuration schedule.

Likewise, the eMS transmitting interleaved frame time slots on egress channels in response to the second TDM configuration schedule (Step 1910*b*) includes additional substeps (not shown). In Step 1910*b*1 the eMS accepts interleaved frame time slots on selected egress backplane data links. In Step 1910*b*2 the eMS buffers the interleaved frame time slots. In Step 1910*b*3 the eMS provides interleaved frame time slots to egress channels in response to the second TDM configuration schedule.

In some aspects, differentiating the cells of each frame into time slots in Step 1906 includes a cellifier using time slot FIFOs to temporally multiplex frame time slots.

In other aspects, the iMS accepting the interleaved frame time slots in Step 1910*a*1 includes accepting the interleaved frame time slot traffic flow on a dedicated ingress data link. The arbiter enabling backplane data link connections between the crossbar and the port cards in response to the third TDM configuration schedule in Step 1912*d* includes the arbiter dedicating backplane data links to the interleaved frame time slot traffic flow. The eMS providing interleaved frame time slots to egress channels in response to the second TDM configuration schedule in Step 1910*b*3 includes the eMS providing interleaved frame time slot traffic flow on a dedicated egress data link.

In some aspects, the iMS accepting the interleaved frame time slots in Step 1910*a*1 includes accepting the interleaved frame time slots on a plurality of cooperating dedicated ingress data links. The arbiter enabling backplane data link connections between the crossbar and the port cards in response to the third TDM configuration schedule in Step 1912*d* includes the arbiter dedicating a plurality of cooperating backplane data links to the interleaved frame time slot traffic flow. The eMS providing interleaved frame time slots to egress channels in response to the second TDM configuration schedule in Step 1912b3 includes the eMS providing interleaved frame time slot traffic flow on a plurality of cooperating dedicated egress data links.

Other aspects of the method include further steps. Step 1909a spatially multiplexes the interleaved frame time slots on the plurality of cooperating dedicated ingress data links. Step 1909b spatially multiplexes the interleaved frame time slots on the plurality of cooperating dedicated backplane data links. Step 1909c spatially multiplexes the interleaved frame time slots on the plurality of cooperating dedicated egress data links.

In some aspects Step 1909a includes multicasting the frame time slots on the cooperating dedicated ingress data links. Likewise. Step 1909b may include multicasting the interleaved frame time slots on the plurality of cooperating dedicated backplane data links. Step 1909c may include multicasting the interleaved frame time slots on the plurality of cooperating dedicated egress data links.

In some aspects, the iMS receiving a first TDM configuration schedule in Step 1910a includes the iMS receiving a plurality of TDM configuration schedules. The eMS receiving a second TDM configuration schedule in Step 1910b includes the eMS receiving a plurality of TDM schedules. The arbiter receiving a third TDM schedule in Step 1910c includes the arbiter receiving a plurality of TDM schedules. Then, the method comprises a further step. In Step 1910e (not shown) the iMS, eMS, and arbiter select a TDM schedule, from among the plurality of accepted schedules, in response to TDM clock signals. Typically, the iMS, eMS, and arbiter simultaneously select a TDM schedule.

Some aspects of the method include further steps. Step 1914, following the eMS transmitting interleaved frame time slots on egress channels, deinterleaves the frame time slots at a decellifier. Step 1916 integrates the time slots into frames. Step 1918 converts from fabric cellified TDM frames to native TDM frames. Step 1920 transmits native TDM frames.

In some aspects, accepting a TDM clock signal in Step 1901a includes a master switch card arbiter accepting the TDM clock signal. Then, using the TDM clock signal to synchronize the first and second TDM configuration schedules, the interleaving of the frame time slots, and the routing of interleaved frame time slots on backplane data links through an intervening crossbar in Step 1901b includes substeps (not shown). In Step 1901b1 the master switch card arbiter distributes the TDM clock signal to a plurality of port card ingress priority queues (iPQs) via grant control link communications. In Step 1901b2 a master port card iPQ distributes the TDM clock signal to a plurality of slave switch card arbiters. In Step 1901b3 each input port card iPQ distributes the TDM clock signal to support the interleaving and differentiation of accepted time slots. In Step 1901b4 each output port card iPQ distributes the TDM clock to support deinterleaving and integrating supplied time slots.

In other aspects, Step 1902, of accepting native TDM frames further includes accepting packet traffic. Then, the method comprises further steps. Step 1922 differentiating the packet traffic into packets. In Step 1924 the iMS accepts the packets. In Step 1926 the iMS supplies packets on selected ingress backplane data links. In Step 1928 the eMS accepts packets on selected egress backplane data links through an intervening crossbar. In Step 1930 the eMS supplies packets on selected egress channels.

A system and method have been provided for communicating TDM traffic through a packet switch fabric. A few examples of use have been given to illustrate the invention. However, the invention is not limited to merely these examples. Other variations and embodiments of the invention will occur to those skilled in the art.

We claim:

1. A method for communicating time division multiplexed (TDM) communications through a packet switch fabric, the method comprising:
   accepting native TDM frames;
   converting the native TDM frames to fabric-cellified TDM frames;
   differentiating the cells of each frame into time slots;
   interleaving the frame time slots;
   TDM scheduling the interleaved frame time slots;
   routing the interleaved frame time slots between input port cards and output port cards on backplane data links through an intervening crossbar;
   wherein TDM scheduling the interleaved frame time slots includes:
   an input port card ingress memory subsystem (iMS) receiving a first TDM configuration schedule including interleaved frame time slots cross-referenced to backplane transmission times; and,
   an output port card egress MS (eMS) receiving a second TDM configuration schedule including interleaved frame time slots cross-referenced to egress channel transmission times; and,
   wherein routing the interleaved frame time slots between input port cards and output port cards on backplane data links through an intervening crossbar includes:
   the iMS transmitting interleaved frame time slots on backplane data links to the eMS in response to the first TDM configuration schedule; and,
   the eMS transmitting interleaved frame time slots on egress channels in response to the second TDM configuration schedule.

2. The method of claim 1 further comprising:
   accepting a TDM clock signal; and,
   using the TDM clock signal to synchronize the first and second TDM configuration schedules, the interleaving of the frame time slots, and the routing of interleaved frame time slots on the backplane data links through the intervening crossbar.

3. The method of claim 2 wherein routing the interleaved frame time slots between port cards on backplane data links through an intervening crossbar includes:
   a crossbar arbiter receiving a third TDM configuration schedule including interleaved frame time slots cross-referenced to backplane transmission times; and,
   the arbiter enabling backplane data link connections between the crossbar and the input and output port cards in response to the third TDM configuration schedule.

4. The method of claim 3 wherein the iMS transmitting interleaved frame time slots on backplane data links to the eMS in response to the first TDM configuration schedule includes:
   the iMS accepting the interleaved frame time slots;
   the iMS buffering the interleaved frame time slots; and,
   the iMS providing interleaved frame time slots to selected ingress backplane data links in response to the first TDM configuration schedule.

5. The method of claim 4 wherein the eMS transmitting interleaved frame time slots on egress channels in response to the second TDM configuration schedule includes:
   the eMS accepting interleaved frame time slots on selected egress backplane data links;
   the eMS buffering the interleaved frame time slots; and, the eMS providing interleaved frame time slots to egress channels in response to the second TDM configuration schedule.

6. The method of claim 5 wherein differentiating the cells of each frame into time slots includes a cellifier using time slot FIFOs to temporally multiplex frame time slots.

7. The method of claim 5 wherein the iMS accepting the interleaved frame time slots includes accepting interleaved frame time slot traffic flow on a dedicated ingress data link;
wherein the arbiter enabling backplane data link connections between the crossbar and the input and output port cards in response to the third TDM configuration schedule includes the arbiter dedicating backplane data links to the interleaved frame time slot traffic flow; and,
wherein the eMS providing interleaved frame time slots to egress channels in response to the second TDM configuration schedule includes the eMS providing interleaved frame time slot traffic flow on a dedicated egress data link.

8. The method of claim 7 wherein the iMS accepting the interleaved frame time slots includes accepting the interleaved frame time slots on a plurality of cooperating dedicated ingress data links;
wherein the arbiter enabling backplane data link connections between the crossbar and the input and output port cards in response to the third TDM configuration schedule includes the arbiter dedicating a plurality of cooperating backplane data links to the interleaved frame time slot traffic flow; and,
wherein the eMS providing interleaved frame time slots to egress channels in response to the second TDM configuration schedule includes the eMS providing interleaved frame time slot traffic flow on a plurality of cooperating dedicated egress data links.

9. The method of claim 8 further comprising:
spatially multiplexing the interleaved frame time slots on the plurality of cooperating dedicated ingress data links;
spatially multiplexing the interleaved frame time slots on the plurality of cooperating dedicated backplane data links; and,
spatially multiplexing the interleaved frame time slots on the plurality of cooperating dedicated egress data links.

10. The method of claim 8 wherein spatially multiplexing the interleaved frame time slots on the plurality of cooperating dedicated ingress data links includes multicasting the interleaved frame time slots on the plurality of cooperating dedicated ingress data links;
wherein spatially multiplexing the interleaved frame time slots on the plurality of cooperating dedicated ingress data links includes multicasting the interleaved frame time slots on the plurality of cooperating dedicated backplane data links; and,
wherein spatially multiplexing the interleaved frame time slots on the plurality of cooperating dedicated egress data links includes multicasting the interleaved frame time slots on the plurality of cooperating dedicated egress data links.

11. The method of claim 8 wherein the iMS receiving a first TDM configuration schedule includes the iMS receiving a plurality of TDM configuration schedules;
wherein the eMS receiving a second TDM configuration schedule includes the eMS receiving a plurality of TDM schedules; and,
wherein the arbiter receiving a third TDM schedule includes the arbiter receiving a plurality of TDM schedules; and, the method further comprising:
the iMS, eMS, and arbiter selecting a TDM schedule, from among a plurality of accepted schedules, in response to TDM clock signals.

12. The method of claim 11 wherein the iMS, eMS, and arbiter selecting a TDM schedule, from among the plurality of accepted schedules, in response to TDM clock signals, includes the iMS, eMS, and arbiter simultaneous selecting a TDM schedule.

13. The method of claim 8 further comprising;
following the eMS transmitting interleaved frame time slots on egress channels, deinterleaving the frame time slots at a decellifier;
integrating the time slots into frames; and
converting from fabric cellified TDM frames to native TDM frames; and,
transmitting the native TDM frames.

14. The method of claim 13 wherein accepting a TDM clock signal includes a master switch card arbiter accepting the TDM clock signal; and,
wherein using the TDM clock signal to synchronize the first and second TDM configuration schedules, the interleaving of the frame time slots, and the routing of interleaved frame time slots on backplane data links through an intervening crossbar includes:
the master switch card arbiter distributing the TDM clock signal to a plurality of port card ingress priority queues (iPQs) via grant control link communications;
a master port card iPQ distributing the TDM clock signal to a plurality of slave switch card arbiters;
each input port card iPQ distributing the TDM clock signal to support the interleaving and differentiation of accepted time slots; and,
each output port card iPQ distributing the TDM clock to support deinterleaving and integrating supplied time slots.

15. The method of claim 1 wherein accepting native TDM frames further includes accepting packet traffic;
the method further comprising:
differentiating the packet traffic into packets;
the iMS accepting the packets;
the iMS supplying packets on selected ingress backplane data links;
the eMS accepting packets on selected egress backplane data links through an intervening crossbar; and,
the eMS supplying packets on selected egress channels.

16. The method of claim 1 wherein accepting native TDM frames includes accepting frames selected from the group including SONET and Digital Wrapper frames.

17. A system for communicating time division multiplexed (TDM) communications through a packet switch fabric, the system comprising:
a cellifier having inputs to accept native TDM frames and outputs to supply interleaved fabric-cellified TDM frames differentiated into time slots, on a TDM schedule;
a switch fabric including:
an input port card having ingress ports connected to the cellifier output and ingress backplane data links to supply interleaved frame time slots on a TDM schedule;
a crossbar having inputs connected to the ingress backplane data links, the crossbar inputs selectively connecting to crossbar outputs;
an output port card having egress backplane data links connected to the crossbar outputs and egress channels to supply interleaved frame time slots on a TDM schedule;

wherein the input port card includes an ingress memory subsystem (iMS), the iMS having inputs to accept the interleaved frame time slots, an input to accept a first TDM configuration schedule, with interleaved frame time slots cross-referenced to backplane transmission times, and outputs connected to the ingress backplane data links to supply interleaved frame time slots in response to the first TDM configuration schedule; and, wherein the output port card includes an egress MS (eMS), the eMS having inputs to accept the interleaved frame time slots on the egress backplane data links, an input to accept a second TDM configuration schedule, with interleaved frame time slots cross-referenced to egress channel transmission times, and outputs connected to the egress channels to supply interleaved frame time slots in response to the second TDM configuration schedule.

18. The system of claim 17 wherein the input and output port cards include ingress priority queues (iPQs), each iPQ having an input to accept a TDM clock signal and an output to distribute the TDM clock signal;

wherein the cellifier has an input to accept the TDM clock signal from the input port card iPQ for synchronizing the time slot and interleaving of cells;

wherein the iMS has an input to accept the TDM clock signal from the input port card iPQ for synchronizing to the first TDM configuration schedule; and, wherein the eMS has an input to accept the TDM clock signal from the output port card iPQ for synchronizing to the second TDM configuration schedule.

19. The system of claim 18 further comprising:
a switch card arbiter having an input to accept a third TDM configuration schedule including interleaved frame time slots cross-referenced to backplane transmission times, and an output to supply crossbar selection commands in response to the third TDM configuration schedule; and, wherein the crossbar resides with a switch card and has an input to accept the crossbar selection commands from the arbiter for enabling backplane data link connections between the crossbar and the input and output port cards.

20. The system of claim 19 wherein the iMS includes a buffer for storing the accepted interleaved time slots and a memory for storing the first TDM configuration schedule.

21. The system of claim 20 wherein the eMS includes a buffer for storing the accepted interleaved time slots and a memory for storing the second TDM configuration schedule.

22. The system of claim 21 wherein the cellifier includes a plurality of time slot FIFOs, and wherein the cellifier uses the time slot FIFOs to temporally multiplex the frame time slots.

23. The system of claim 21 wherein the iMS accepts interleaved frame time slot traffic flow on dedicated ingress data links from the cellifier;

wherein the arbiter dedicates backplane data links to the interleaved frame time slot traffic flow between the input and output port cards; and, wherein the eMS provides interleaved frame time slot traffic flow on dedicated egress data links.

24. The system of claim 23 wherein the iMS accepts the interleaved frame time slots on a plurality of cooperating dedicated ingress data links;

wherein the arbiter dedicates a plurality of cooperating backplane data links to the interleaved frame time slot traffic flow between the input and output port cards; and, wherein the eMS provides interleaved frame time slot traffic flow on a plurality of cooperating dedicated egress data links.

25. The system of claim 24 further comprising:
wherein the cellifier includes a switch for spatially multiplexing the interleaved frame time slots on the plurality of cooperating dedicated ingress data links;

wherein the iMS includes a switch for spatially multiplexing the interleaved frame time slots on the plurality of cooperating dedicated backplane data links; and, wherein the eMS includes a switch for spatially multiplexing the interleaved frame time slots on the plurality of cooperating dedicated egress data links.

26. The system of claim 24 wherein the iMS multicasts the interleaved frame time slots on the plurality of cooperating dedicated backplane data links; and, wherein the eMS multicasts the interleaved frame time slots on the plurality of cooperating dedicated egress data links.

27. The system of claim 24 wherein the iMS accepts and stores a plurality of TDM configuration schedules, and selects a TDM configuration schedule for use in response to TDM clock signals;

wherein the eMS accepts and stores a plurality of TDM configuration schedules, and selects a TDM configuration schedule for use in response to TDM clock signals; and, wherein the arbiter accepts and stores a plurality of TDM configuration schedules, and selects a TDM configuration schedule for use in response to TDM clock signals.

28. The system of claim 27 wherein the iMS, eMS, and arbiter simultaneously select a TDM configuration schedule.

29. The system of claim 24 further comprising;
a decellifier having inputs connected to the output port card egress channels, the decellifier deinterleaving the frame time slots, integrating the frame time slots into fabric-cellified TDM frames, converting the fabric-cellified TDM frames to native TDM frames, and transmitting the native TDM frames at an output.

30. The system of claim 29 further comprising:
a plurality of switch cards;
a plurality of input and output port cards;
wherein a master switch card arbiter accepts the TDM clock signal and distributes it to the plurality of input and output port cards;

wherein a master port card iPQ accepts the TDM clock signal and distributes to the plurality of switch cards; and, wherein each input port card iPQ distributes the TDM clock signal to an interfacing cellifier; and, wherein each output port card iPQ distributes the TDM clock signal to an interfacing decellifier.

31. The system of claim 17 wherein the iMS accepts a packet traffic differentiated into packets and supplies packets on selected ingress backplane data links;

wherein an arbiter enables backplane data link connections between the crossbars, the iMS, and the eMS in response to negotiating with input port card iPQs; and, wherein the eMS accepts packets on selected egress backplane data links through an intervening crossbar and supplies packets on selected egress channels.

32. The system of claim 17 wherein the cellifier accepts native TDM frames selected from the group including SONET and Digital Wrapper frames.

* * * * *